United States Patent
Raghavan et al.

(10) Patent No.: US 11,770,172 B2
(45) Date of Patent: Sep. 26, 2023

(54) DYNAMIC ANTENNA SELECTION IN MILLIMETER WAVE SYSTEMS

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 16/365,289

(22) Filed: Mar. 26, 2019

(65) Prior Publication Data
US 2019/0349058 A1 Nov. 14, 2019

Related U.S. Application Data

(60) Provisional application No. 62/669,823, filed on May 10, 2018.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0408* (2013.01); *H04B 7/0456* (2013.01);
(Continued)

(58) Field of Classification Search
CPC .. H04B 7/0695; H04B 7/0617; H04B 7/0456; H04B 7/088; H04B 7/0408;
(Continued)

(56) References Cited

U.S. PATENT DOCUMENTS 9,715,609 B1 * 7/2017 Fink .................... H04B 7/0408
2006/0009174 A1 * 1/2006 Dunn .................. H03G 3/3042
455/127.1
(Continued)

FOREIGN PATENT DOCUMENTS

CN 105191378 A 12/2015
CN 106465027 A 2/2017

OTHER PUBLICATIONS

International Search Report and Written Opinion—PCT/US2019/024387—ISA/EPO—dated Jul. 4, 2019.

*Primary Examiner* — Redentor Pasia
(74) *Attorney, Agent, or Firm* — Holland & Hart LLP

(57) ABSTRACT

Methods, systems, and devices for wireless communications in millimeter wave (mmW) systems are described. A mmW wireless device may identify a plurality of subsets of antennas from available antennas. The wireless device may compare effective array gain values for each subset in the plurality of subsets of antennas. An effective array gain value may be determined based on a realized array gain for each subset normalized or penalized by a radio frequency (RF) power consumption for antennas corresponding to each subset in the plurality of subsets of antennas. Based on the comparison, the wireless device may select one or more subsets of the plurality of subsets of antennas, the selected one or more subsets may correspond to antenna combinations of one or more antenna subarray units. The mmW wireless device may then communicate using the selected one or more subsets.

30 Claims, 14 Drawing Sheets

(51) Int. Cl.
*H04B 7/0456* (2017.01)
*H04B 7/08* (2006.01)
*H04B 7/0408* (2017.01)
*H04W 16/28* (2009.01)

(52) U.S. Cl.
CPC .......... *H04B 7/0617* (2013.01); *H04B 7/088* (2013.01); *H04L 5/0082* (2013.01); *H04W 16/28* (2013.01)

(58) Field of Classification Search
CPC .. H04B 7/0602; H04B 7/0691; H04B 7/0808; H04B 7/082; H04B 7/0874; H04B 7/0404; H04B 1/0053–0064; H04B 7/022–0897; H04L 5/0082; H04W 16/28; Y02D 30/00; Y02D 30/70
See application file for complete search history.

(56) References Cited

U.S. PATENT DOCUMENTS

| | | | | |
|---|---|---|---|---|
| 2008/0051149 A1* | 2/2008 | Mehta | ............... | H04B 7/061 455/562.1 |
| 2008/0080449 A1* | 4/2008 | Huang | ............... | H04B 7/0417 370/342 |
| 2008/0260002 A1* | 10/2008 | Zhang | ............... | H04B 7/0626 375/144 |
| 2010/0002649 A1* | 1/2010 | Teo | ............... | H04L 5/0048 370/330 |
| 2010/0330928 A1* | 12/2010 | Prasad | ............... | H04B 7/088 342/372 |
| 2012/0071187 A1* | 3/2012 | Karaoguz | ............... | H04W 72/0453 455/509 |
| 2013/0207841 A1* | 8/2013 | Negus | ............... | H01Q 21/065 342/359 |
| 2013/0301455 A1* | 11/2013 | Jung | ............... | H04W 72/0406 370/252 |
| 2013/0343416 A1* | 12/2013 | Lancaster | ............... | C03C 3/325 372/40 |
| 2014/0044207 A1* | 2/2014 | Han | ............... | H04B 7/0413 375/267 |
| 2014/0056381 A1* | 2/2014 | Wang | ............... | H04B 7/0874 375/295 |
| 2014/0242924 A1* | 8/2014 | Uhl | ............... | H04B 1/525 455/79 |
| 2015/0010099 A1 | 1/2015 | Lin et al. | | |
| 2015/0117435 A1* | 4/2015 | Baldemair | ............... | H04B 7/06 375/326 |
| 2015/0188237 A1* | 7/2015 | Apostolos | ............... | H01Q 21/08 343/824 |
| 2015/0280793 A1 | 10/2015 | Byun et al. | | |
| 2016/0198474 A1* | 7/2016 | Raghavan | ............... | H04B 7/0617 370/335 |
| 2016/0269092 A1* | 9/2016 | Wich | ............... | H04B 7/0691 |
| 2017/0170890 A1* | 6/2017 | Takano | ............... | H04B 1/709 |
| 2017/0347358 A1 | 11/2017 | Raghavan et al. | | |
| 2018/0138951 A1* | 5/2018 | Boudreau | ............... | H04B 7/024 |
| 2018/0261928 A1* | 9/2018 | Wang | ............... | H01Q 21/20 |
| 2019/0237872 A1* | 8/2019 | Oshima | ............... | H04B 17/318 |

* cited by examiner

DYNAMIC ANTENNA SELECTION IN MILLIMETER WAVE SYSTEMS

CROSS REFERENCES

The present Application for Patent claims the benefit of U.S. Provisional Patent Application No. 62/669,823 by Raghavan, et al., entitled "Dynamic Antenna Selection in Millimeter Wave Systems," filed May 10, 2018, assigned to the assignee hereof, and expressly incorporated by reference herein.

BACKGROUND

The following relates to wireless communications, and more specifically to dynamic antenna selection in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as mmW systems or other systems that use beamforming, a wireless device (e.g., base station, UE) may communicate with coordinated entities using multiple antennas. In a mmW system, wireless devices may be configured to use a large number of antennas and operate at a high frequency. The described configuration and operations may result in high radio frequency (RF) power consumption associated with corresponding antennas of the communication. As a result, current techniques for performing wireless communications in mmW systems, in some instances, may be deficient.

SUMMARY

The described techniques relate to improved methods, systems, devices, and apparatuses that support methods for dynamic antenna selection in millimeter wave (mmW) systems. In mmW systems, wireless devices are configured with multiple antennas, which may be used for directional or beamformed transmissions. The multiple antennas may be contained within a number of antenna subarrays, and each subarray may be connected with multiple radio frequency (RF) chains (e.g., chains of RF circuitry related to operating the subarray). The use of an increased number of antennas and therefore an increased amount of associated RF circuitry may contribute to increased energy consumption at the wireless device. To enhance performance improvement, a wireless device may perform methods for selecting one or more antenna subsets from available antennas within the configured antenna subarrays. The described methods may include calculating and comparing effective array gain values associated with selected antenna subsets and determining phase shift and amplitude control combinations corresponding to antennas of each selected antenna subset. Determination of the phase shift and amplitude control combination may be based on beam training procedure. The selected antenna subsets may be dynamically implemented within sub-durations of a coordinated transmission time interval (TTI), and enhance system performance and spectral efficiency while maintaining coverage distribution.

A method of wireless communication at a first mmW device is described. The method may include identifying a set of subsets of antennas from available antennas of the mmW device, comparing effective array gain values for each subset in the set of subsets of antennas, the effective array gain values based on a realized array gain normalized or penalized by a RF power consumption for each subset in the set of subsets of antennas, selecting one or more subsets of the set of subsets of antennas based on the comparison, and communicating with a second mmW device using the selected one or more subsets of the set of subsets of antennas.

An apparatus for wireless communication at a first mmW device is described. The apparatus may include a processor, memory in electronic communication with the processor, and instructions stored in the memory. The instructions may be executable by the processor to cause the apparatus to identify a set of subsets of antennas from available antennas of the mmW device, compare effective array gain values for each subset in the set of subsets of antennas, the effective array gain values based on a realized array gain normalized or penalized by a RF power consumption for each subset in the set of subsets of antennas, select one or more subsets of the set of subsets of antennas based on the comparison, and communicate with a second mmW device using the selected one or more subsets of the set of subsets of antennas.

Another apparatus for wireless communication at a first mmW device is described. The apparatus may include means for identifying a set of subsets of antennas from available antennas of the mmW device, comparing effective array gain values for each subset in the set of subsets of antennas, the effective array gain values based on a realized array gain normalized or penalized by a RF power consumption for each subset in the set of subsets of antennas, selecting one or more subsets of the set of subsets of antennas based on the comparison, and communicating with a second mmW device using the selected one or more subsets of the set of subsets of antennas.

A non-transitory computer-readable medium storing code for wireless communication at a first mmW device is described. The code may include instructions executable by a processor to identify a set of subsets of antennas from available antennas of the mmW device, compare effective array gain values for each subset in the set of subsets of antennas, the effective array gain values based on a realized array gain normalized or penalized by a RF power consumption for each subset in the set of subsets of antennas, select one or more subsets of the set of subsets of antennas based on the comparison, and communicate with a second mmW device using the selected one or more subsets of the set of subsets of antennas.

In some examples of the method, apparatuses, and non-transitory computer-readable medium described herein, communicating using the one or more subsets may include operations, features, means, or instructions for using a first antenna combination of the selected one or more subsets during a TTI.

In some examples of the method, apparatuses, and non-transitory computer-readable medium described herein, the first antenna combination includes a set of antennas from antennas of the selected one or more subsets.

In some examples of the method, apparatuses, and non-transitory computer-readable medium described herein, the TTI includes the first antenna combination in a first sub-TTI and further includes a second antenna combination of the selected one or more subsets during a second sub-TTI, the TTI spanning one or more symbol periods.

In some examples of the method, apparatuses, and non-transitory computer-readable medium described herein, comparing the effective array gain values for each subset in the set of subsets of antennas may include operations, features, means, or instructions for determining an effective array gain value for each subset in the set of subsets of antennas.

In some examples of the method, apparatuses, and non-transitory computer-readable medium described herein, the determined effective array gain value for each subset in the set of subsets of antennas may be based on a calculated realized array gain with the second mmW device normalized or penalized by RF power consumption corresponding to antennas for each subset in the set of subsets of antennas.

In some examples of the method, apparatuses, and non-transitory computer-readable medium described herein, the determined effective array gain values for each subset in the set of subsets of antennas may be associated with an energy efficiency determination.

In some examples of the method, apparatuses, and non-transitory computer-readable medium described herein, selecting the one or more subsets may include operations, features, means, or instructions for determining phase shift and amplitude control combinations corresponding to antennas of each subset in the selected one or more subsets.

In some examples of the method, apparatuses, and non-transitory computer-readable medium described herein, the phase shift and amplitude control combinations corresponding to available antennas of each subset in the selected one or more subsets reconstruct one or more channels for communication at the first mmW device.

Some examples of the method, apparatuses, and non-transitory computer-readable medium described herein may include operations, features, means, or instructions for reconstruction of the one or more channels may be aided by unitary beam training codebooks, quasi-unitary beam training codebooks, or a combination.

Some examples of the method, apparatuses, and non-transitory computer-readable medium described herein may include operations, features, means, or instructions for selecting a first subset of antennas from the set of subsets of antennas, determining phase shift and amplitude control combinations corresponding to available antennas of the first subset of antennas, selecting a second subset of antennas from the set of subsets of antennas, determining phase shift and amplitude control combinations corresponding to available antennas of the second subset of antennas and determining the effective array gain values for the first subset of antennas and the second subset of antennas.

Some examples of the method, apparatuses, and non-transitory computer-readable medium described herein may include operations, features, means, or instructions for determining the phase shift and amplitude control combinations corresponding to available antennas of the first subset of antennas and available antennas of the second subset of antennas may be based on a beam training procedure.

In some examples of the method, apparatuses, and non-transitory computer-readable medium described herein, the beam training procedure includes training beams corresponding to available antennas of the first subset of antennas and available antennas of the second subset of antennas.

Some examples of the method, apparatuses, and non-transitory computer-readable medium described herein may include operations, features, means, or instructions for selecting a set of subsets of antennas from the available antennas of the mmW device, the selecting based on an expected effective array gain of the subsets of antennas and determining the phase shift and amplitude control combinations corresponding to available antennas of each subset in the selected one or more subsets.

In some examples of the method, apparatuses, and non-transitory computer-readable medium described herein, determining the phase shift and amplitude control combinations corresponding to available antennas of each subset in the selected one or more subsets may include operations, features, means, or instructions for performing a beam training procedure for each subset in the selected one or more subsets, where the beam training includes training beams corresponding to available antennas of each subset in the selected one or more subsets.

In some examples of the method, apparatuses, and non-transitory computer-readable medium described herein, performing the beam training on the selected one or more subsets may include operations, features, means, or instructions for evaluating beam width considerations of the training beams.

Some examples of the method, apparatuses, and non-transitory computer-readable medium described herein may include operations, features, means, or instructions for selecting the one or more subsets of the set of subsets of antennas may be based on an expected effective array gain of the subsets of antennas.

In some examples of the method, apparatuses, and non-transitory computer-readable medium described herein, the available antennas of the mmW device include antennas arranged in one or more planar arrays or linear arrays.

In some examples of the method, apparatuses, and non-transitory computer-readable medium described herein, the selected one or more subsets correspond to a non-uniform, non-linear antenna array.

DETAILED DESCRIPTION

Figure 1:
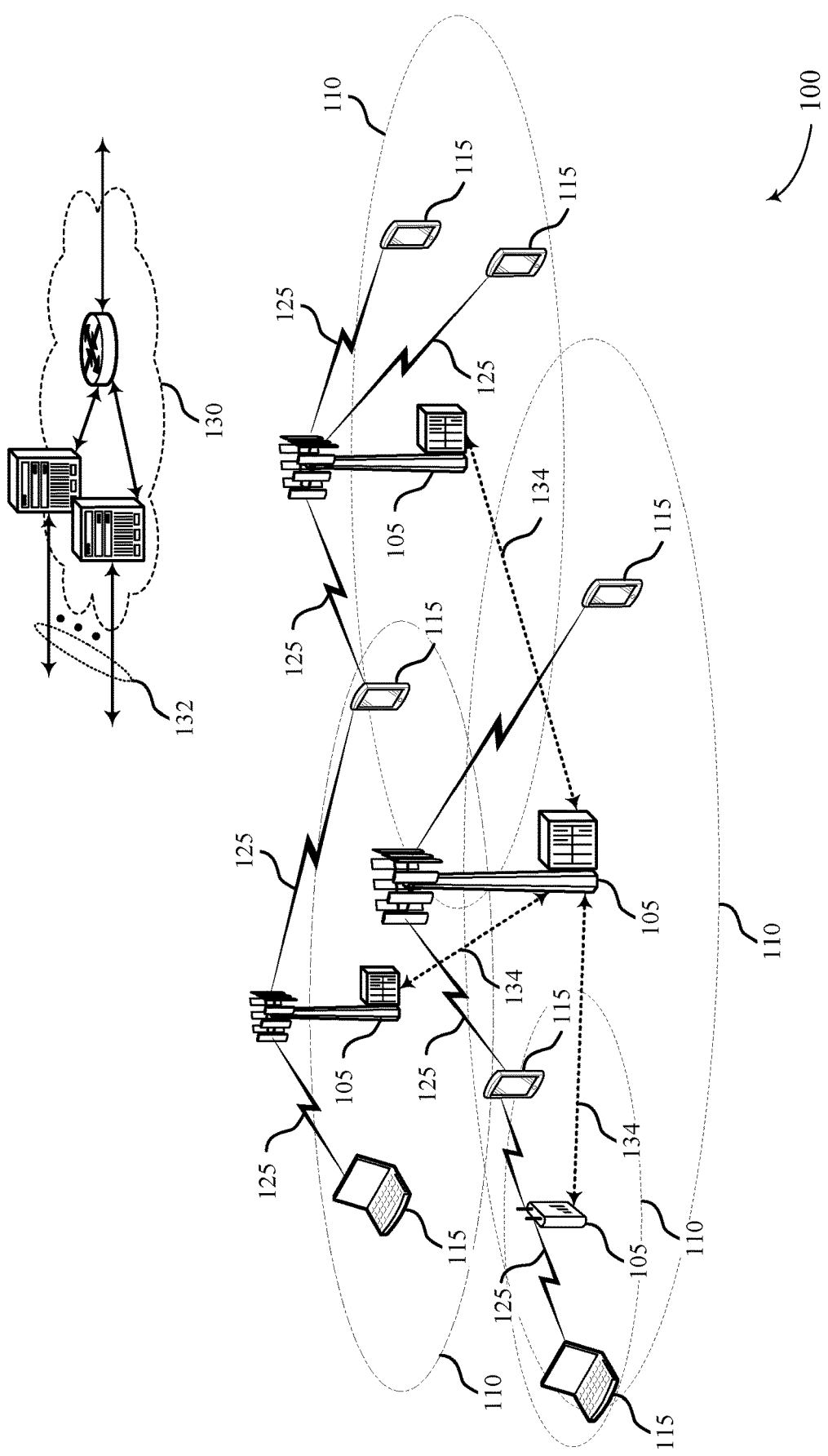
FIG. 1 illustrates an example of a wireless communications system that supports methods for dynamic antenna selection in millimeter wave (mmW) systems in accordance with aspects of the present disclosure.

In millimeter wave (mmW) systems, wireless devices are configured with multiple antennas, which may be used for directional or beamformed transmissions. The multiple antennas may span one or more antenna subarray units. The antenna subarray units may include small-sized linear or planar arrays placed at difference positions or locations of the wireless device, and each subarray may be connected with multiple radio frequency (RF) chains (e.g., chains of RF circuitry related to operating the subarray). In some examples, the antenna subarray units may be form-factor constrained at the wireless device due to size, configuration, or arrangement constraints associated with hardware, software, or network architecture characteristics. Communication over mmW frequency spectrum bands may enhance antenna architecture subject to form-factor constraints, allowing a greater number of omni-directional antennas with reduced antenna spacing.

Increased data coverage enhancements due to communications in mmW frequency spectrum bands, however, may present challenges at a wireless devices. Due to increased antenna scaling for mmW systems, a wireless device exercising all antennas of contained antenna subarray units may incur large RF energy consumption overhead for communication. This may be the case for battery powered devices, such as mobile communication devices, as well as grid power devices, such as base stations. In some examples, the wireless device may enhance performance by selecting one or more subsets of antennas from available antennas of the wireless device. Selecting the one or more subsets of antennas may include omni-directional beam training procedures and array gain computation of the selected one or more subsets, for enhanced antenna selection.

Techniques are described for enhanced antenna selection and beam training in a mmW communication system. Such techniques may include procedures for selecting one or more antenna subsets to satisfy performance coverage and effective array gain over a configured transmission time interval (TTI). A wireless device configured for communication over mmW frequency spectrum bands may identify a plurality of antenna subsets from available antennas of the system. The wireless device may determine and compare effective array gain values for each subset in the one or more antenna subsets. An effective array gain may be determined based on a realized array gain for each subset, normalized or penalized by RF power consumption associated with the corresponding antennas of each subset. From the comparing, the wireless device may select one or more subsets of the plurality of antenna sub sets.

In some examples, the wireless device may perform the selecting based on a beam training procedure for each of the plurality of antenna subsets, where one or more phase shift and amplitude computations may be determined. The wireless device may then compute effective array gain values associated with the determined phase shift and amplitude combinations. The wireless device may compare the computed effective array gain values to determine a maximized effective array gain and associated one or more subsets of the plurality of subsets.

In other examples, the wireless device may perform the selecting from a plurality antenna subsets corresponding to an expected effective array gain computation. For example, the wireless device may select a plurality of antenna subsets according to a maximized expected effective array gain computation. The wireless device may then select one or more subsets of the plurality of antenna subsets based on the expected effective array gain. The wireless device may execute beam training procedures for antennas of the selected one or more subsets. Based on the beam training procedure, the wireless device may determine a phase shift and amplitude control combination corresponding to antennas of the selected one or more subsets.

The wireless device may execute the selected one or more subsets on a dynamic basis throughout a configured TTI. Data information may be coded according to the dynamically selected antenna combinations to improve array gain of data signaling subject to RF power consumption at the excited antennas, and therefore promote effective array gain. Such effective array gain benefits may be realized for all signal to noise ratios (SNRs) experienced by the wireless device.

Aspects of the disclosure are initially described in the context of a wireless communications system. Aspects of the disclosure are further illustrated by and described with reference to apparatus diagrams, system diagrams, and flowcharts that relate to methods for dynamic antenna selection in mmW systems.

FIG. 1 illustrates an example of a wireless communications system 100 that supports methods for dynamic antenna selection in millimeter wave (mmW) systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some examples perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other examples, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other examples, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some examples, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples of wireless communications system 100, a wireless device (e.g., a UE 115, a base station 105) may perform communication, including data transmission or reception, on channels of a mmW frequency spectrum bandwidth (i.e., mmW systems). Configured communication over mmW frequency spectrum bands may enhance the antenna architecture of the wireless device subject to form-factor constraints. In some examples, mmW systems communication may allow a wireless device to support a greater number of omni-directional antennas with reduced antenna spacing. The omni-directional antennas may be contained and exercised within one or more antenna subarray units. The antenna subarray units may include small-sized linear or planar arrays placed at difference positions or locations of the wireless device, and each subarray may be connected with RF chains (e.g., chains of RF circuitry related to operating the subarray).

In contrast to sub-6 GHz (e.g., LTE) communications bandwidth spectrum, excitement of all antennas within the antenna subarray units corresponding to enhanced mmW systems may impose variance to RF power consumption at both the wireless device and a coordinated entity of the communication. In some examples, the realized array gain associated with excitement of enhanced antenna configurations may simultaneously correspond to increased RF power consumption. As such, communication efficiency may be analyzed by the wireless device according to effective array gain computations. An effective array gain may be measured according to the realized array gain normalized or penalized by the RF power consumption of the number of excited antennas.

According to one or more aspects of the present disclosure, a wireless device may dynamically select one or more subsets of the plurality of subsets of antennas from available antennas of the system, for enhanced signal performance and spectral efficiency. The wireless device may select the one or more subsets according an expected effective array gain computation or an iterated procedure within the available antennas of the antenna subarray units. The wireless device may select the one or more subsets to maximize the effective array gain for communication. In some examples, the wireless device may perform the determining based on a beam training procedure for each of the selected antenna subsets, where one or more phase shift and amplitude computations corresponding to antennas of the one or more subsets may be determined.

The wireless device may then implement the selected subsets on a dynamic basis throughout a configured TTI. Data information may be coded on the dynamically selected antenna combinations to promote effective array gain over one or more sub-durations of the TTI. Such effective array gain benefits may be realized for all SNRs experienced by the wireless device. Examples of such effective array gain realization and antenna selection implementation are described further below.

Figure 2:
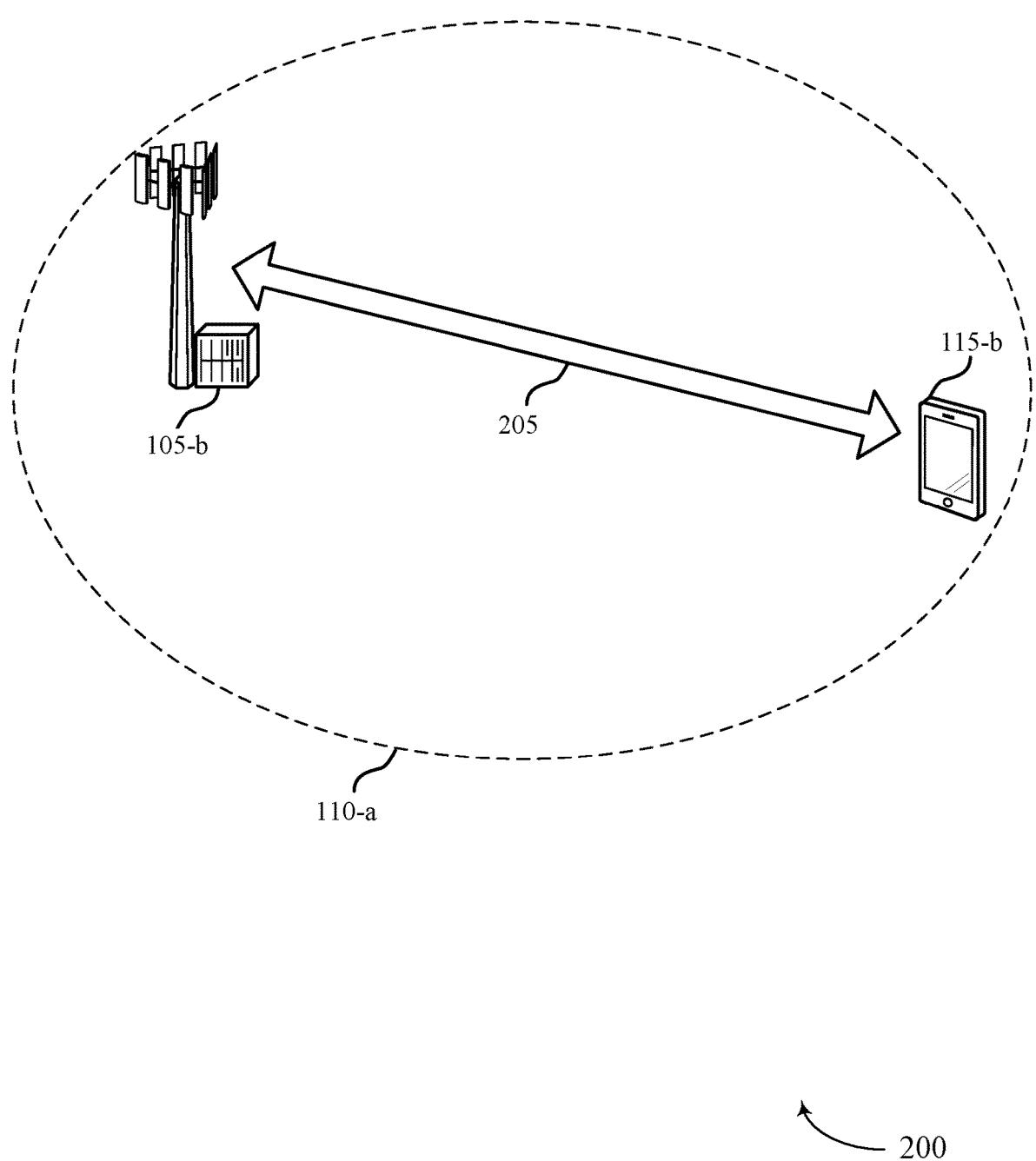
FIG. 2 illustrates an example of a wireless communications system that supports methods for dynamic antenna selection in mmW systems in accordance with aspects of the present disclosure.

FIG. 2 illustrates an example of a wireless communications system 200 that supports methods for dynamic antenna selection in millimeter wave (mmW) systems in accordance with aspects of the present disclosure. In some examples, wireless communications system 200 may implement aspects of wireless communication system 100. In some examples, the wireless communications system 200 may include a base station 105-a and UE 115-a, which may be examples of the corresponding devices as described with reference to FIG. 1. UE 115-a may communicate with the base station 105-a within a coverage area 110-a.

In some examples, the base station 105-a and the UE 115-a may be configured to communicate via an established communication link 205. Each of the base station 105-a and the UE 115-a may be referred to as wireless devices, and perform communication over mmW frequency band spectrum. In some examples, the base station 105-a may be configured with multiple antennas, which may be used for directional or beamformed transmissions. Similarly, the UE 115-a may be configured with multiple antennas, which may be used for directional or beamformed transmissions. In some examples, the base station 105-a or the UE 115-a may transmit a number of beamformed communication beams in different directions within a coverage area or receive communications using receive beamforming. In some examples, the base station 105-a may be configured with a large number of antennas communicating at mmW carrier frequencies (such as 28 GHz). Similarly, the UE 115-a may be configured with a large number of antenna subarrays (such as 4 subarrays). In some examples, the antenna subarrays included in the UE 115-a may be used for providing modular coverage. More specifically, in mmW systems, a first subarray of the UE 115-a may be configured to cover a first direction and a second subarray of the UE 115-a may be configured to cover a second direction. By using each subarray for a different direction, the UE 115-a may efficiently cover an allocated link budget.

Wireless devices operating in mmW carrier frequencies may sustain enhanced antenna architectures subject to form-factor constraints, allowing a greater number of directional antennas with reduced antenna spacing. Increased antenna scaling for mmW systems may correspond to enhanced array gain and capacity, due to a larger set of excited antennas operable by the wireless device. However, increased antenna scaling may be vulnerable to increased power consumption. In some examples, each subarray in a wireless device (e.g., base station 105-a, UE 115-a) may be connected with multiple RF chains and each RF chain circuitry may be configured to operate at a high frequency (e.g., 28 GHz). As a result, when multiple subarrays are each coupled with multiple RF chains, a wireless device exciting each antenna of the multiple subarrays for data communication may burn a large amount of energy (e.g., operating a full template of antennas and increased number of RF chains may consume an increased amount of energy). The present disclosure relates to dynamic selection of antenna subsets for enhanced performance improvement over all SNRs.

In mmW systems supporting beamforming, the wireless device may dynamically select one or more subsets of a plurality of subsets of antennas from the available antennas of the wireless device. Ideally, a wireless device may select any subset of antenna combinations from the available antennas. That is, for a set of N available antennas, any combination of K antennas, comprising an antenna subset, may be selected for implementation. Such a selection process may correspond to the following number of possible antenna subset selection combinations L, where:

$$L = \binom{N}{K} = \frac{N(N-1)\ldots(N-K+1)}{K(K-1)\ldots 1} = \frac{N!}{K!(N-K)!} \quad (1)$$

The number of possible combinations L may increase exponentially as the overall number of available antennas N increases. For example, for a set of 32 available antennas, a selection of a 4 antenna subset may result in approximately $2^{15}$ possible antenna subset selection combinations. Similarly, a selection of 8 antennas may result in approximately $2^{23}$ subset selection combinations. By selecting a subset of the possible antenna subsets, the realized rate gains associated with the combination selection may correspond to 15 and 23 bits, respectively.

Practical constraints associated with the RF chain circuitry of the one or more antenna subarrays, additional form factor constraints of the wireless device, the coordinated network architecture operated by the system, or any combination may limit the practicality of antenna combination selection (e.g., 15 and 23 bit realized rate gains, as described above). As a result, a smaller collection of antenna subset combinations (i.e., a subset $L_2$ of the antenna subset selection combinations L) may be considered from the one or more selected antenna subsets while sustaining moderate antenna selection and spectral efficiency gains for the wireless device (i.e. approximately 3-4 bits). The determined antenna combinations may correspond to reduced selection overhead spanning the coordinated TTI of the communication including settling to time-constants, antenna non-overlap, power, RF complexity, and the like.

In some examples, a wireless device may determine the set of antenna combinations for communicating over the coordinated TTI according to an iterative procedure. The wireless device may select a subset $L_1$ within the range of potential antenna subset values from the N available antennas and subject to the relation $L_2 \leq L_1 \leq L$. Each of the one or more antenna subsets may correspond to antenna groupings spanning antennas from one or more subarray units of the wireless device.

The wireless device may implement a beam training procedure for the associated antennas of the antenna subsets, for directional transmission or reception. For each antenna subset, the wireless device may implement the beam training according to a codebook of the wireless device (e.g., implemented in software). The number of training beams corresponding to the codebook selection may be associated with the number of antennas contained within each subset selection, for consistent channel reconstruction (e.g., number of training beams is equivalent to the number of antennas). The training beams may be selected based on a unitary beam training codebook or a quasi-unitary beam training codebook associated with the mmW system. A unitary beam training codebook may be based on unitary discrete Fourier transform (DFT) matrices. A quasi-unitary beam training codebook may be based on quasi-unitary DFT matrices or orthogonal designs. In addition, the wireless device may further determine a beam weight or quantization associated with the training beams of the codebook selection. Based on information from the beam training, the wireless device may calculate and compare phase shift and amplitude control combinations associated with the training beams. The described procedure may be executed for one or more $L_1$ selected antenna subsets, up to the available antennas N of the antenna subarrays.

The wireless device may implement the one or more phase shift and amplitude control combinations of the $L_1$ antenna subsets, for channel reconstruction of reference signaling to a coordinated device. For example, a base station may perform beam training and determine the phase shift and amplitude control combinations for each selected antenna subset combination. The base station may transmit reference signaling for each antenna subset via downlink signaling indication and receive reference signal received power (RSRP) response indication from one or more coordinated UEs. Similarly, a UE may provide uplink reference signaling indication using a determined phase shift and amplitude control combination of a selected antenna subset, and receive a response indication. Based on the calculated phase shift and amplitude control combinations, the wireless device may calculate and compare the effective array gain associated with the selected antenna subsets. The wireless device may evaluate the received response indication and determine the maximized effective array gain associated with the selected antenna subsets for one or more of the $L_1$ antenna subsets.

Following determination of the maximized effective array gain, the wireless device may determine an antenna subset size (i.e., determine a $L_2$ value). The wireless device may then select one or more subsets of the plurality of subsets of antennas, the selected one or more subsets associated with the maximized array gain value. The selected subsets may then be implemented by the wireless device for dynamic antenna selection as part of information coding within a communication link.

In other examples, a wireless device may determine the set of antenna combinations for communicating over the coordinated TTI according to multi-stage procedure. The wireless device may perform one or more expected effective array gain computations and select a plurality of antenna subsets from the available antennas of the antenna subarrays. Selection of the antenna subset may include determination of an antenna subset value (e.g., determine a $L_2$ value) based on the comparison of the computed expected effective array gain values.

Based on the antenna subset selection, the wireless device may select one or more subsets of the plurality of subsets of antennas associated a maximized expected effective array gain value. Selection of the one or more subsets may include selecting multiple antenna subsets associated with the determined antenna subset value and determining the set of antenna combinations that maximize the expected effective array gain. The wireless device may then implement a beam training procedure for the associated antennas of the determined set of antenna combinations, for directional transmission or reception. For the set of antenna combinations, the wireless device may implement the beam training according to a codebook of the wireless device (e.g., implemented in software). The number of training beams corresponding to the codebook selection may be associated with the number of antennas contained within each subset selection, for consistent channel reconstruction (e.g., number of training beams equivalent to the number of antennas). The training beams may be selected based on a unitary beam training codebook or quasi-unitary beam training codebook associated with the mmW system. A unitary beam training codebook may be based on unitary DFT matrices or orthogonal designs. A matrix may be considered unitary if a conjugate transpose of the matrix is also the inverse of the matrix. A quasi-unitary beam training codebook may be based on quasi-unitary DFT matrices. A matrix may be considered quasi-unitary if the properties of the matrix approximate or share characteristics of a unitary matrix (i.e., a rectangular matrix containing unitary or approximately unitary columns, or a rectangular matrix with unitary or approximately unitary rows).

Based on the beam training procedure, the wireless device may calculate a phase shift and amplitude control combination associated with the antennas of the selected subsets. The determined set of antenna combinations may then be implemented by the wireless device according to the calculated phase shift and amplitude control combinations associated with the distinct beam paths of the antenna combinations. The antenna combinations may support dynamic antenna selecting as part of information coding within a communication link.

According one or more aspects of the present disclosure, coordination between wireless devices may aid in performance of antenna subset selection associated with a maximized effective array gain. For example, coordination between a base station and a UE may be used to terminate either of the disclosed procedures mid-process. In other examples, coordination between a base station and a UE may be used to bias or pre-seed an antenna search procedure or implement command instructions for beam training (i.e., determination of the number of beams to use for training, beam width considerations, etc.).

The implemented set of selected subsets may promote dynamic antenna selection within a coordinated TTI of a communication link. For example, the wireless device may support the dynamic antenna selection on a granular level, allowing a symbol by symbol antenna configuration selection. That is, the wireless device may support dynamic antenna selection on a per symbol basis within a coordinated TTI. The implemented set of antenna combinations may maximize realized array gain by the transmitting device relative to RF power consumption constraints. Data communication according to the set of antenna combinations may be performed by the wireless device, for data transmission or reception over communication link 205.

Figure 3:
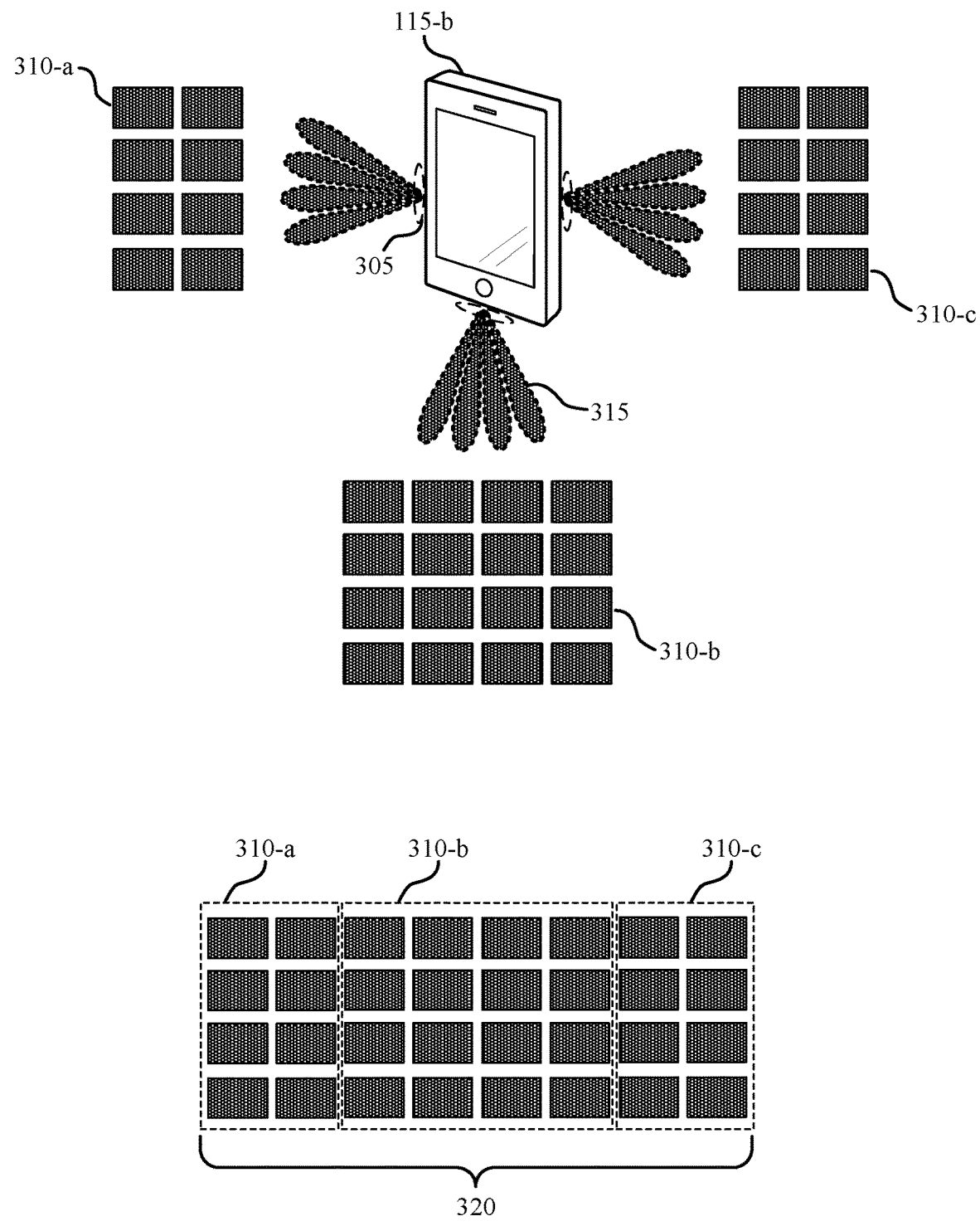
FIG. 3 illustrates an example of an antenna subarray architecture that supports methods for dynamic antenna selection in mmW systems in accordance with aspects of the present disclosure.

FIG. 3 illustrates an example of an antenna subarray architecture 300 that supports methods for dynamic antenna selection in millimeter wave (mmW) systems in accordance with aspects of the present disclosure. In some examples, the antenna subarray architecture 300 may correspond to implemented aspects of the wireless communications systems 100 and 200. Base station 105-b and UE 115-b may be examples of the corresponding devices described with reference to FIGS. 1 and 2. As illustrated, antenna subarray architecture 300 may correspond to one or more antenna subarray units associated with antenna modules of a UE, such as a UE 115. In other examples (not shown), antenna subarray architecture 300 may correspond to one or more antenna subarray units associated with antenna modules of a base station or alternative wireless device coordinated for communication over mmW frequency bandwidth spectrum.

A UE 115-b may include one or more antenna modules 305 containing antenna subarray units for directional (i.e., beamformed) signaling as part of a communication array over distinct paths of the mmW frequency spectrum bandwidth. Support for mmW systems communication may enable UE 115-b to support a greater number of omnidirectional antennas within the antenna subarray units, with reduced antenna spacing relative to sub 6 GHz communication device configuration. Associated antennas contained within the one or more antenna subarrays may support directional beamforming in a plurality of beam directions, as indicated by the directional beams 315. UE 115-b may emit the directional beams 315 in the mmW frequency spectrum to conduct beamforming operations for directional communication.

The antenna subarray units may include small-sized linear or planar arrays placed at difference positions or locations of the UE 115-b, and each subarray may be connected with multiple RF chains (e.g., chains of RF circuitry related to operating the subarray). For example, a first antenna subarray 310-a may contain a linear or planar (as illustrated) array of associated antennas for directional signaling at UE 115-b. Alternative antenna arrays 310-b and 310-c may be associated with alternative antenna modules 305 and may be executed for directional communication heterogeneous to antenna subarray 310-a. Within each antenna subarray 310, the included antennas may correspond to patch/dipole elements of the available antennas of UE 115-b, with inter-element spacing supported according to the form factor constraints of UE 115-b. In some examples, one or more antenna subarrays 310-a and 310-b may support common antenna subarray dimensionality. In other examples, an antenna subarray 310-c may support distinct antenna subarray dimensionality.

UE 115-b may consider the plurality of antenna subarrays 310 associated with the antenna modules 305 within a planar array placement template 320. The template array 320 may exhibit a uniform planar array representative of the realized non-uniform, non-linear grouping of subarrays 310. As part of a dynamic antenna selection procedure, for maximized effective antenna gain realization subject to RF power consumption, the UE 115-b may evaluate and determine one or more antenna subsets of the template array 320. The one or more antenna subsets may correspond to antenna selections from one or more of the antenna subarrays 310. Based on selection of the one or more antenna subsets, the UE may determine a set of antenna combinations (for maximized antenna gain) within the antenna subarrays 310, and implement the antenna combinations via the antenna modules 305. The implementation may promote dynamic antenna selection on a granular level, throughout a coordinated TTI of the mmW system, such as the TTI 405 with reference to FIG. 4.

Figure 4:
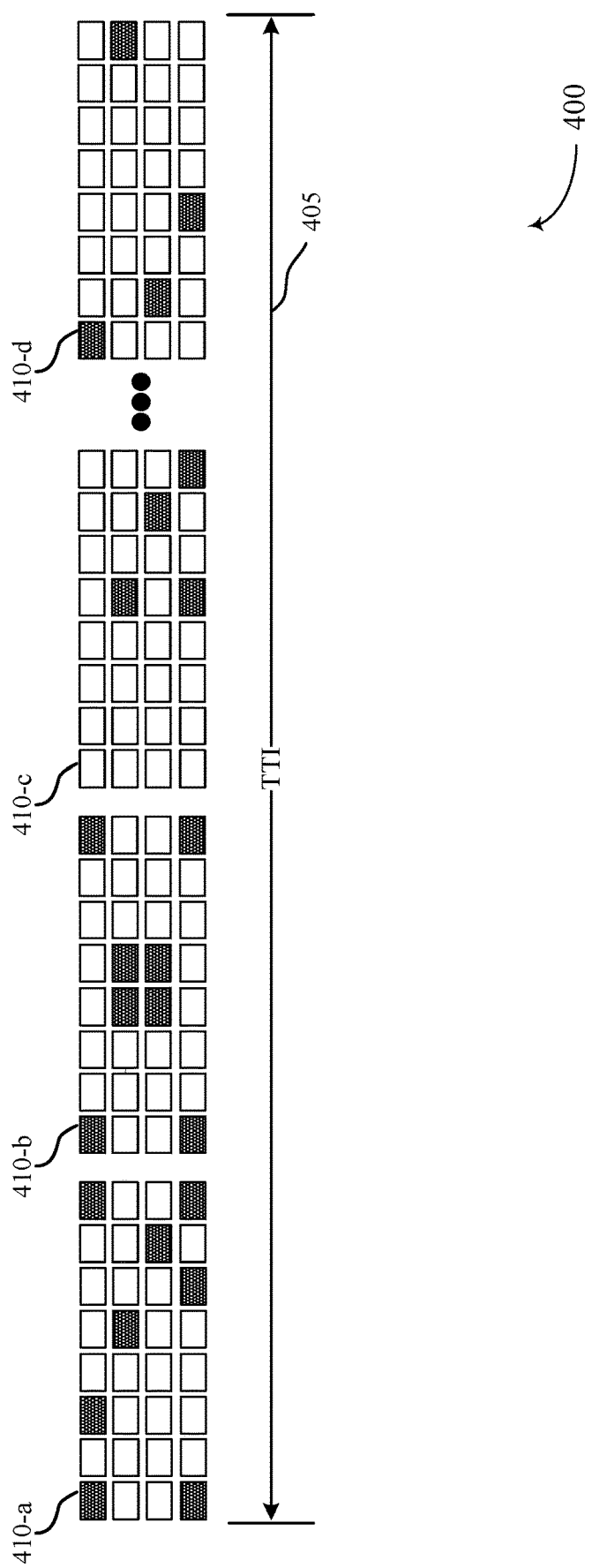
FIG. 4 illustrates an example of a communication scheme that supports methods for dynamic antenna selection in mmW systems in accordance with aspects of the present disclosure.

FIG. 4 illustrates an example of a communication scheme 400 that supports methods for dynamic antenna selection in millimeter wave (mmW) systems in accordance with aspects of the present disclosure. In some examples, the communication scheme 400 may implement aspects of the wireless communications systems 100 and 200. Base station 105-b and UE 115-b may be examples of the corresponding devices described with reference to FIGS. 1 and 2. The communication scheme 400 may be associated with selected antenna subsets of one or more antenna subarrays 310 corresponding to antenna subarray architecture 300 with reference to FIG. 3.

A TTI 405 may span one or more sub-durations, for implementation of the determined set of antenna subsets 410. For example, a wireless device operating within the mmW system may coordinate data signaling over a plurality of symbols. As a result, to maximize effective antenna gain subject to RF power consumption constraints, the wireless device may implement dynamic antenna selection on a per-symbol basis, for granular spectral efficiency associated with the communication.

Based on determination of a set of antenna combinations for information coding, the wireless device may dynamically implement a first antenna combination 410-a within an appropriate temporal duration of TTI 405. For example, the wireless device may implement antenna combination 410-a within a first symbol period of TTI 405. The wireless device may subsequently implement a second antenna combination 410-b within a succeeding symbol period or appropriate duration. The determined antenna combinations 410 may be considered by the wireless device based on a uniform template array of the antenna subarrays, such as template 320 of FIG. 3. As a result the selected antenna combinations of the dynamic antenna selection may correspond to antennas at one or more antenna subarrays of the wireless device.

In some examples, the set of antenna combinations may include antenna combinations from variant antenna subset values $L_2$ relative to the available antennas N of the antenna subarrays. That is, additional antenna combinations 410-c and 410-d, spanning alternative temporal durations of the TTI 405 may correspond to antenna combinations containing a number of antennas distinct from antenna combination 410-a, antenna combination 410-b, or both. For example, antenna combinations 410-a and 410-b may include oriented antenna selections associated with an 8 antenna subset of 32 available antennas. One or more additional antenna combinations, such as antenna combinations 410-c and 410-d, may include oriented antenna selections associated with a 4 antenna subset of 32 available antennas, as illustrated. Additional examples may be implemented at the transmitting device, subject to practical constraints associated with selection overhead. Such practical constraints may include a settling of time-constants, antenna non-overlap, power, RF complexity, and the like. Variant antenna subset value selection may aid in maximizing effective antenna gain for communication and allow enhanced efficiency at the wireless device for dynamic antenna selection.

Figure 5:
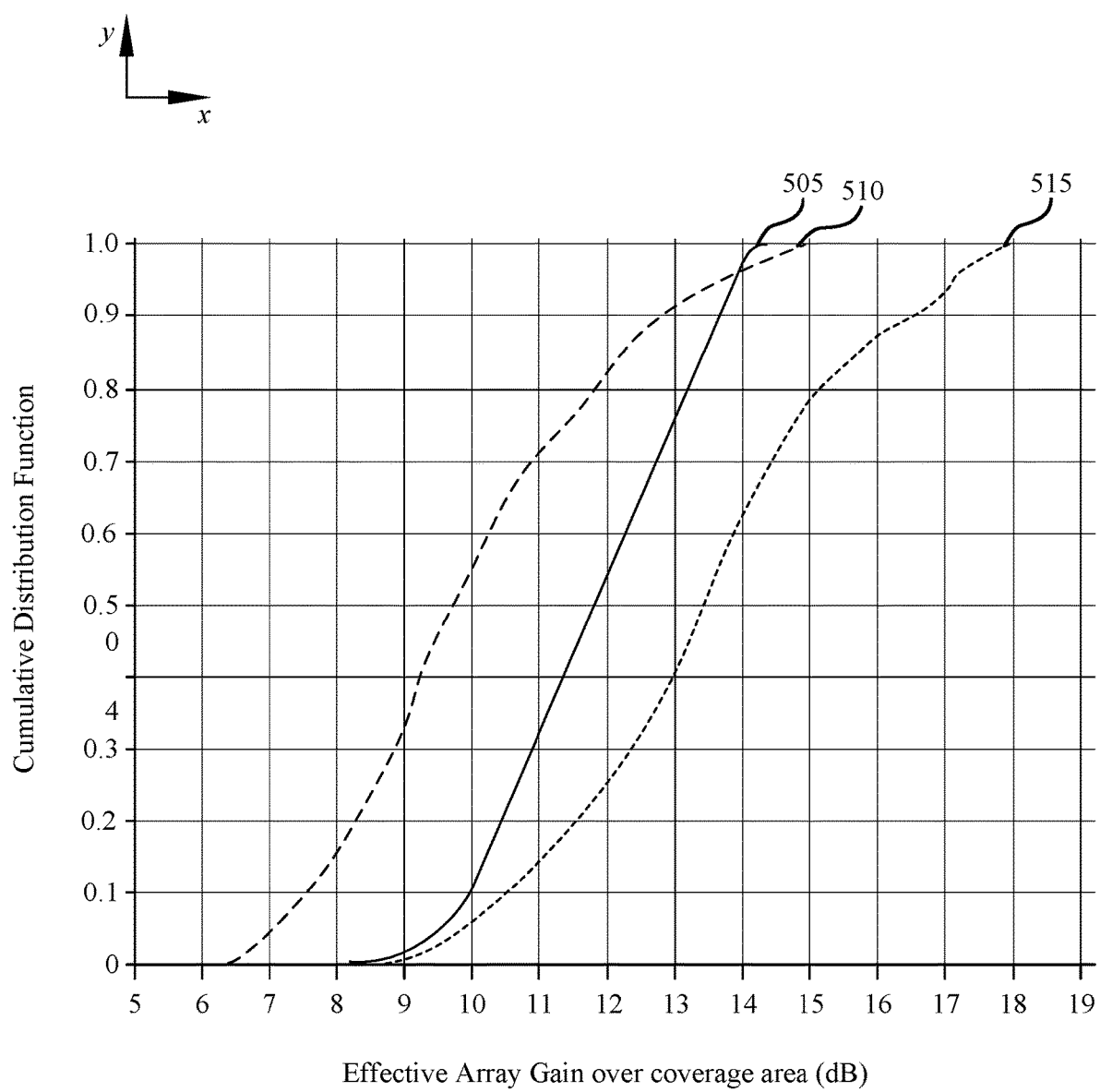
FIG. 5 shows a plot that illustrates methods for dynamic antenna selection in mmW systems in accordance with aspects of the present disclosure.

FIG. 5 shows a plot 500 that illustrates methods for dynamic antenna selection in millimeter wave (mmW) systems in accordance with aspects of the present disclosure. In some examples, the plot 500 may illustrate performance results for implementations of the communication scheme 400 associated with one or more selected subarrays 310 corresponding to an antenna subarray architecture 300, with reference to FIGS. 3 and 4.

Dynamic antenna selection, including determination of a set of antenna combinations associated with subframes of available antennas may provide practical benefits in comparison to excitation of all antennas associated with a wireless device. In some examples, antenna selection of a subset of antennas can produce comparable or enhanced effective array gains in comparison to all antennas of a system. Effective array gain may be realized as the computed realized array gain of the data signaling normalized or penalized by RF power consumption due to form factor constraints of the wireless device (e.g., number of antennas), For dB scale measurement, effective array gain may be calculated as shown:

$$\text{Effective Array Gain[dB]} = \text{Realized Array Gain[dB]} - 10 \log_{10}|A| \quad (2)$$

where $|A|$=number of antennas used by the wireless device. In one example, the realized array gain may include an array gain measured for a specific set of antennas using one or more specific beams. In one example, the realized array gain may include a calculated or estimated array gain without direct measurements of the specific set of antennas or the one or more specific beams. For example, a calculated effective array gain may be computed based on known performance of an antenna array in combination with current channel measurements even if those channel measurements don't correspond to the exact set of antennas or the one or more specific beams. Additional factors such as signal attenuation conditions, network architecture configuration, or additional operation circumstance may impact the realized array gain of a wireless device. Effective array gains can be expected at a wireless device according to discernment of antenna combination implementation above a SNR.

Plot 505 illustrates the effective array gain (in dB) of an antenna template containing 32 total antennas spanning one or more antenna subarrays. Such a procedure may correspond to a baseline scheme of the wireless device, where all antennas of the system are excited, and the use of 16 calculated training beams is implemented to satisfy the cumulative distribution function (CDF) proportionality of a coverage area (e.g., 120°×45°). As shown, increased coverage from 0.0 to 1.0 CDF of the coverage area may correspond to an effective array gain of approximately 5 dB, from slightly above 8 dB to slightly above 13 dB.

Plots 510 and 515 correspond to dynamic antenna selection schemes associated with antenna subarrays of the system. Plot 510 may correspond to an 8 antenna subset of the 32 available antennas and plot 515 may correspond to a 4 antenna subset of the 32 available antennas. Each of the dynamic antenna selection schemes associated with plots 510 and 515 may be based on beam weight quantization associated with determined phase shift combinations (e.g., 2 bit phase shift combination) relative to 16 calculated training beams. As shown, increased coverage from 0.0 to 1.0 CDF may result in an effective antenna gain increase from approximately 6 dB to 15 dB for the 8 antenna subset scheme, shown by plot 510. For the 4 antenna subset scheme, increased coverage from 0.0 to 1.0 CDF may result in an effective antenna gain increase from approximately 9.5 dB to 18 dB, shown by plot 515.

Therefore, as illustrated within the plot 500, subset antenna selection may promote operability enhancement within a coverage area in comparison to excitement of all antennas of a system. System benefits may be subject to system settings. As a result, variant system conditions may promote benefit for alternative subset antenna selections (i.e., 8 antenna subset promotes coverage enhancements exceeding 4 antenna subset).

Figure 6:
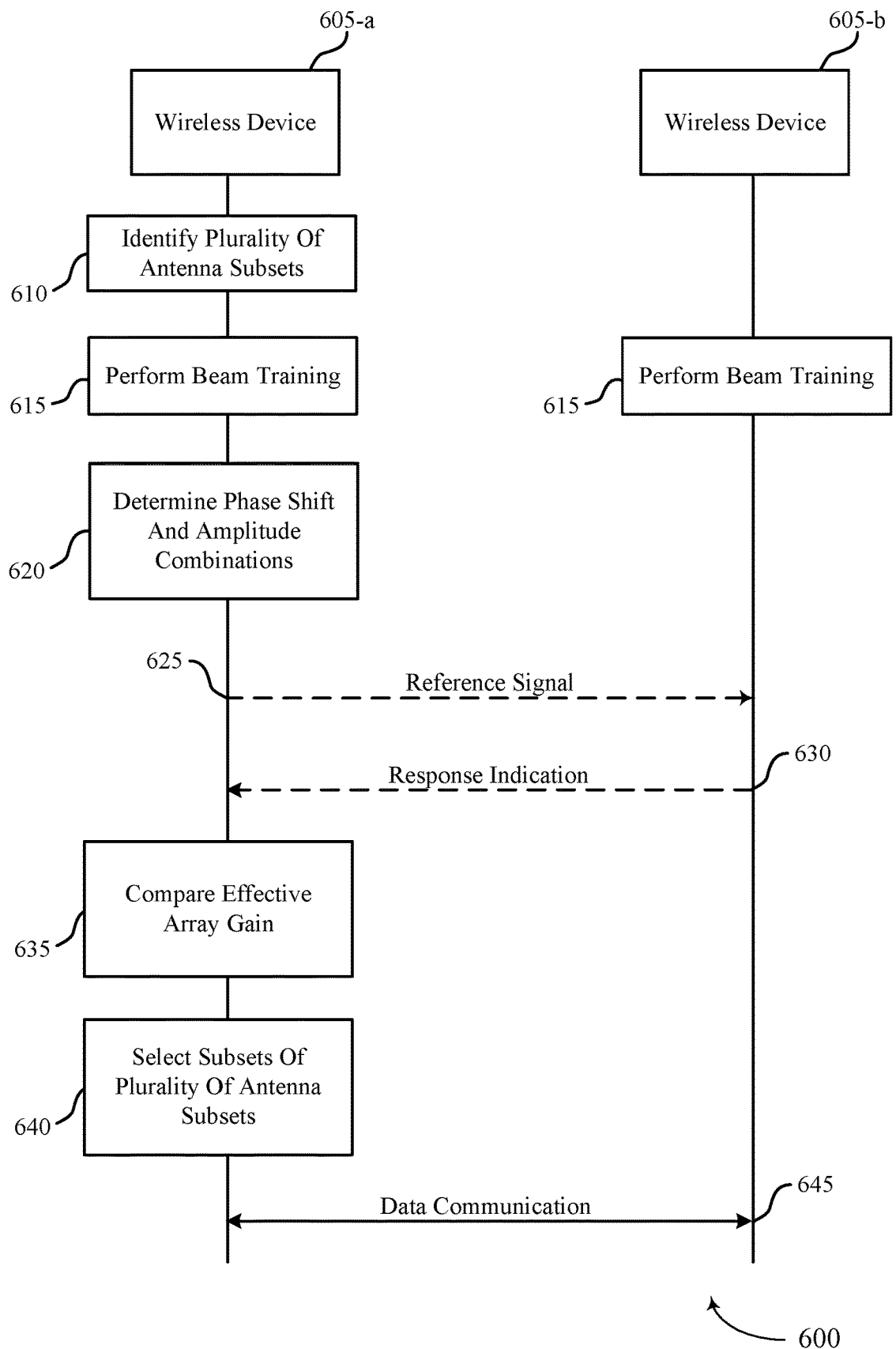
FIG. 6 illustrates an example of a process flow that supports methods for dynamic antenna selection in mmW systems in accordance with aspects of the present disclosure.

FIG. 6 illustrates an example of a process flow 600 that supports methods for dynamic antenna selection in millimeter wave (mmW) systems in accordance with aspects of the present disclosure. In some examples, the process flow 600 may implement aspects of the wireless communications system 100 and 200. Wireless devices 605-a and 605-b may be examples of the corresponding devices, such as a base station 105 or a UE 115, as described with reference to FIGS. 1 and 2.

At 610, a wireless device 605-a may identify antennas of one or more configured antenna subarrays and select antenna subsets of size $L_2$. The wireless device 605-a may select a subset value $L_2$ within the range (i.e., L) of potential antenna subset values for the N available antennas of the antenna subarrays. Based on the subset value selection, the wireless device 605-a may randomly or semi-randomly select one or more antenna subsets of cardinality corresponding to the subset value $L_2$. Each of the one or more antenna subsets may correspond to antenna groupings spanning antennas from one or more subarray units of the wireless device.

For each selected antenna subset, wireless devices 605-a and 605-b may perform beam training 615. For each antenna subset, the wireless devices 605 may implement the beam training according to a codebook of the wireless device (e.g., implemented in software). The number of training beams corresponding to the codebook selection may be associated with the number of antennas contained within each subset selection, for consistent channel reconstruction (e.g., number of training beams equivalent to the number of antennas). The training beams may be selected based on a unitary beam training codebook or a quasi-unitary beam training codebook associated with the mmW system. In addition, the wireless devices 605-a and 605-b may further determine a beam weight or quantization associated with the training beams of the codebook selection.

At 620, wireless device 605-a may determine and compare phase shift and amplitude control combinations based on the beam training procedure 615. Based on the comparison, wireless device 605-a may determine a phase shift and amplitude control combination for the selected antenna subsets. The determination may be iterated for one or more selected antenna subset values $L_2$, up to the available antennas N of the antenna subarrays. As such, each of steps 610 through 620 may be iterated for one or more antenna subset values $L_2$. Each of the determined phase shift and amplitude control combinations of the selected antenna subsets may be exercised for reference signal transmission 625, with a coordinated wireless device 605-b.

At 630, the coordinated wireless device 605-b may transmit a response indication (e.g., RSRP indication) based on the received reference signaling 625. Wireless device 605-a may receive the response indication 630 and compute an effective array gain for the selected antenna subsets, based on the determined phase shift and amplitude control combinations of the beam training procedure.

At 635, wireless device 605-a may compare the computed effective array gain values of the one or more selected antenna subsets. Based on the received response indication 630, wireless device 605-a may determine a maximized effective array gain of the mmW system. Based on the maximized effective array gain, at 640, wireless device 605-a may determine an antenna subset value $L_2$ and a set of antenna combinations for dynamic antenna selection associated with communication over a coordinated TTI.

At 645, each of the wireless devices 605 may communicate over resources of the mmW frequency spectrum band according to the coordinated TTI. Wireless device 605-a may perform a dynamic antenna selection procedure over one or more sub-durations of the TTI. The dynamic antenna procedure may include implementation of the set of antenna combinations, as determined at step 640.

Figure 7:
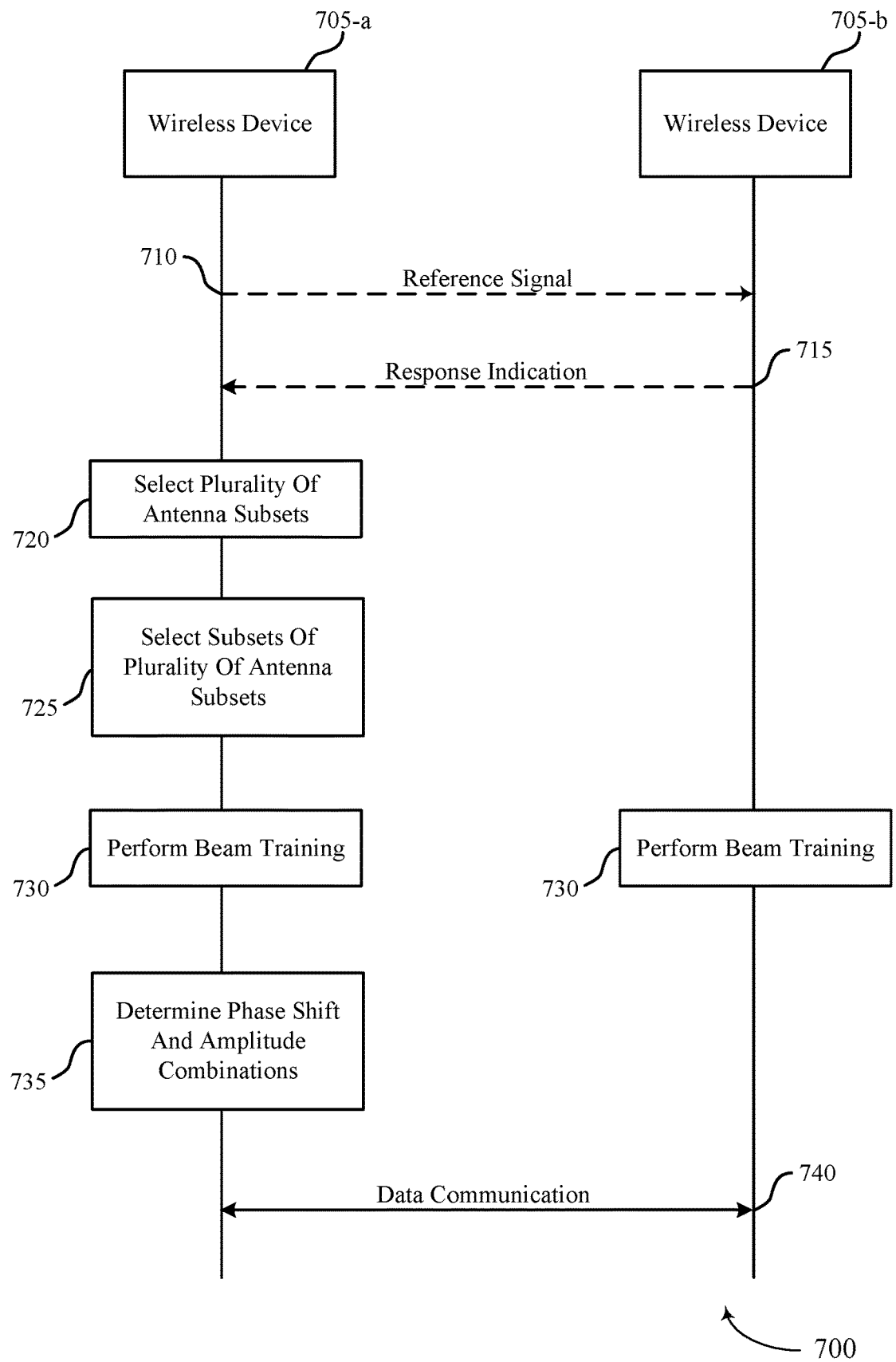
FIG. 7 illustrates an example of a process flow that supports methods for dynamic antenna selection in mmW systems in accordance with aspects of the present disclosure.

FIG. 7 illustrates an example of a process flow 700 that supports methods for dynamic antenna selection in millimeter wave (mmW) systems in accordance with aspects of the present disclosure. In some examples, the process flow 700 may implement aspects of the wireless communications system 100 and 200. Wireless devices 705-a and 705-b may be examples of the corresponding devices, such as a base station 105 or a UE 115, as described with reference to FIGS. 1 and 2.

At 710, a wireless device 705-a may transmit reference signaling to one or more coordinated wireless devices 705-b. The reference signaling may contain signaling indications of one or more antenna subsets. The antenna subsets may span antenna subset values $L_2$, up to the available antennas N of the antenna subarrays at wireless device 705-a. At 715, the coordinated wireless device 705-b may transmit one or more response indications (e.g., RSRP indication) based on the received reference signaling 710.

Based on the received response signaling 715, wireless device 705-a may identify antennas of one or more configured antenna subarrays and select antenna subsets of a subset value $L_2$, as part of an antenna selection 720. Subset value $L_2$ may be based on a computed expected effective array gain maximization according the received response signaling 715. Based on the subset value selection, wireless device 705-a may randomly or semi-randomly select a plurality of antenna subsets of cardinality corresponding to the subset value $L_2$. Each of the plurality antenna subsets may correspond to antenna groupings spanning antennas from one or more subarray units of the wireless device.

At 725, wireless device 705-a may determine a set of antenna combinations from the selected antenna subsets. The determination for the set of antenna combinations may be based on the expected effective array gain computations. In some examples, coordinated signaling between the wireless devices 705 may aid wireless device 705-a in determining the set of antenna combinations.

At 730, wireless devices 705-a and 705-b may perform beam training for the determined set of antenna combinations. The wireless devices 705 may implement the beam training according to a codebook of the wireless device (e.g., implemented in software). The number of training beams corresponding to the codebook selection may be associated with the number of antennas contained within the set of determined antenna combinations, for consistent channel reconstruction (e.g., number of training beams equivalent to the number of antennas). The training beams may be selected based on a unitary beam training codebook or a quasi-unitary beam training codebook associated with the mmW system. In addition, the wireless devices 705-a and 705-b may further determine a beam weight or quantization associated with the training beams of the codebook selection.

At 735, wireless device 705-a may determine and compare phase shift and amplitude control combinations based on the beam training procedure 730. Based on the comparison, wireless device 705-a may determine a phase shift and amplitude control combination for the selected subsets.

Based on the determination, at 740 each of the wireless devices 705 may communicate over resources of the mmW frequency spectrum band according to a coordinated TTI. Wireless device 705-a may perform a dynamic antenna selection procedure over one or more sub-durations of the TTI. The dynamic antenna procedure may include implementation of the set of antenna combinations, as determined at step 735.

Figure 8:
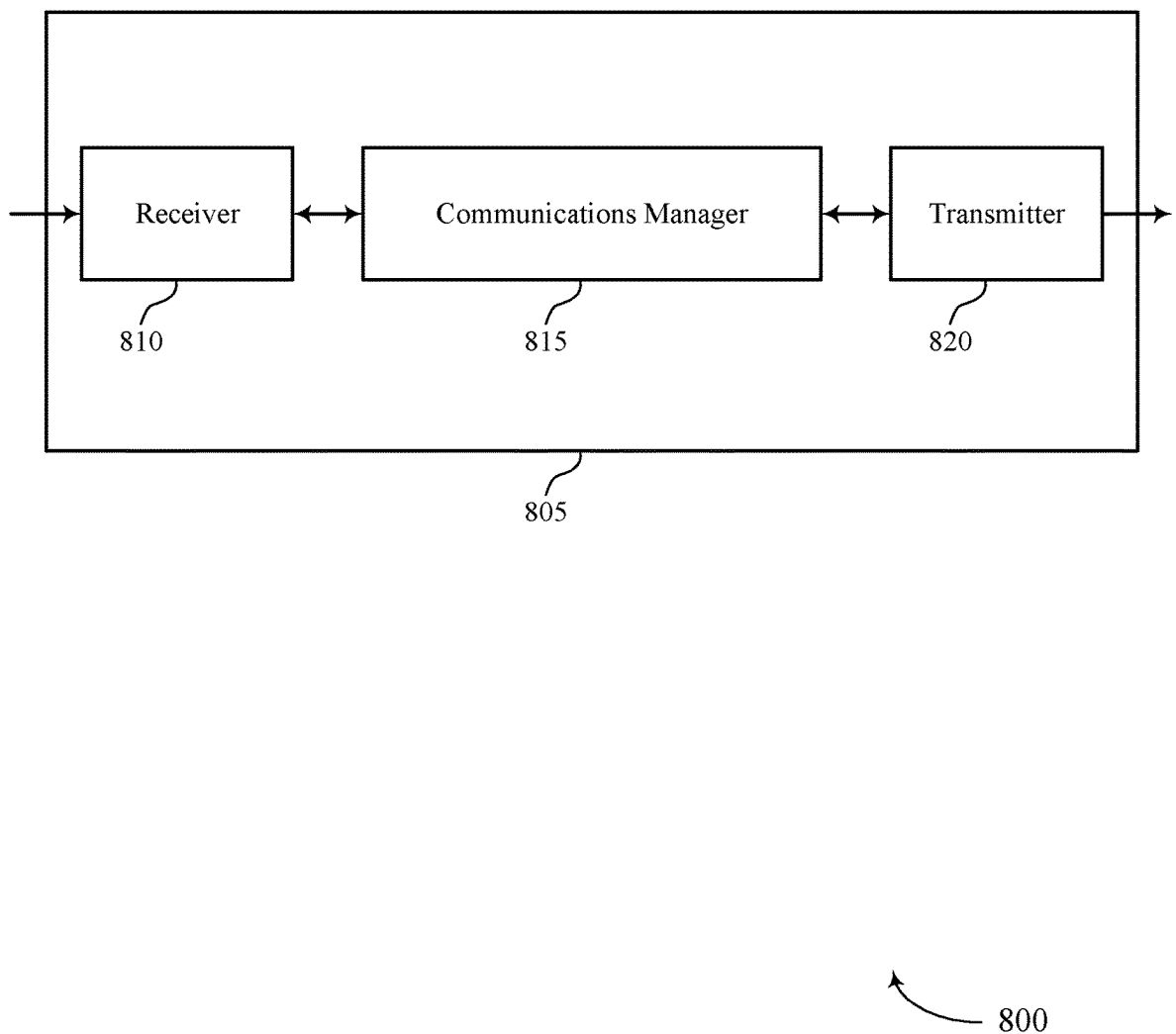
FIGS. 8 and 9 show block diagrams of devices that support methods for dynamic antenna selection in mmW systems in accordance with aspects of the present disclosure.

FIG. 8 shows a block diagram 800 of a device 805 that supports methods for dynamic antenna selection in millimeter wave (mmW) systems in accordance with aspects of the present disclosure. The device 805 may be an example of aspects of a device as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to methods for dynamic antenna selection in mmW systems, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a set of subsets of antennas from available antennas of the mmW device, compare effective array gain values for each subset in the set of subsets of antennas, the effective array gain values based on a realized array gain normalized or penalized by a RF power consumption for each subset in the set of subsets of antennas, select one or more subsets of the set of subsets of antennas based on the comparison, and communicate with a second mmW device using the selected one or more subsets of the set of subsets of antennas. The communications manager 815 may be an example of aspects of the communications manager 1110 described herein.

The communications manager 815, or its sub-components, may be implemented in hardware, code (e.g., software or firmware) executed by a processor, or any combination. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
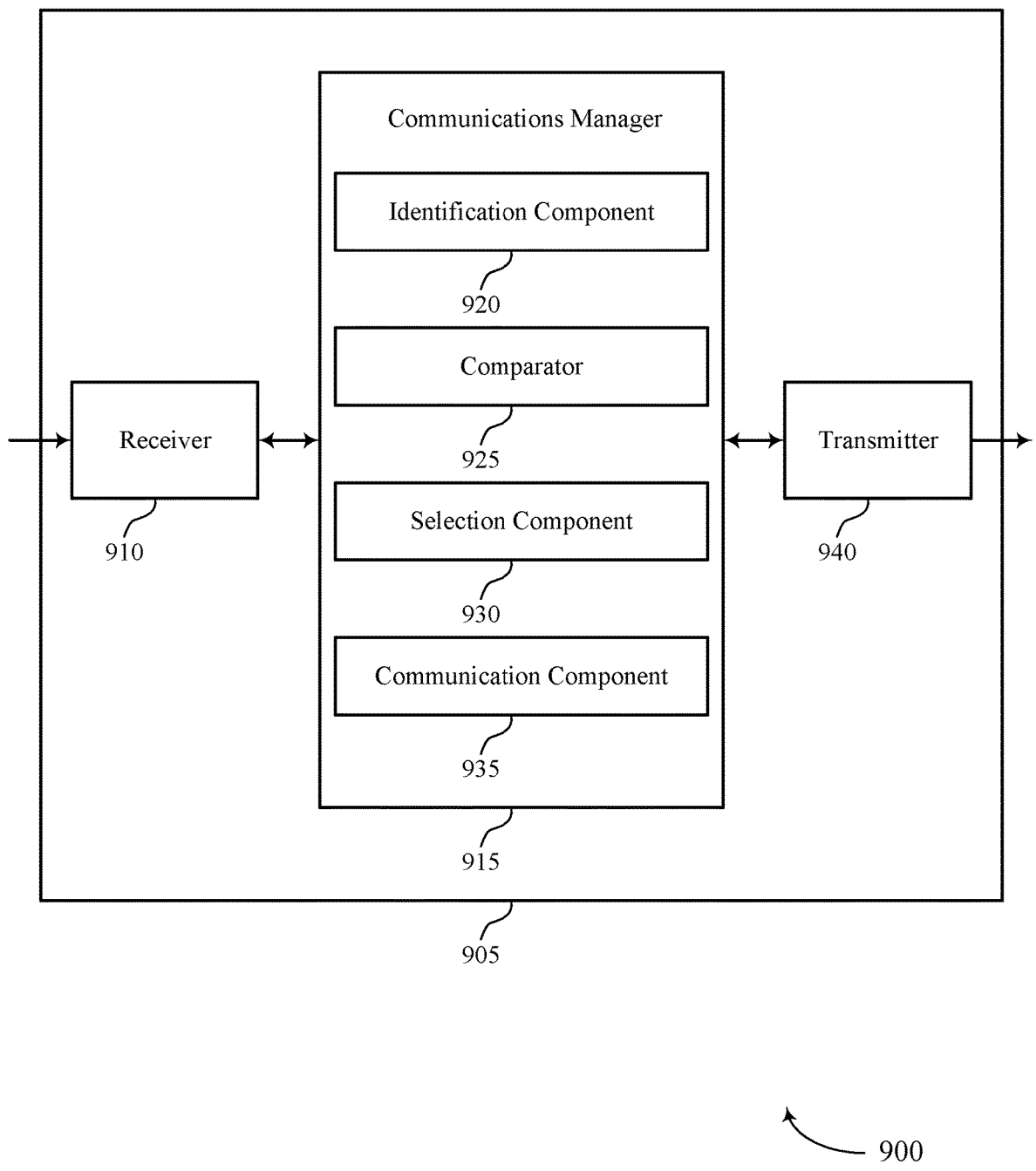

FIG. 9 shows a block diagram 900 of a device 905 that supports methods for dynamic antenna selection in millimeter wave (mmW) systems in accordance with aspects of the present disclosure. The device 905 may be an example of aspects of a device 805 or a device as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to methods for dynamic antenna selection in mmW systems, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an identification component 920, a comparator 925, a selection component 930, and a communication component 935. The communications manager 915 may be an example of aspects of the communications manager 1110 described herein.

The identification component 920 may identify a set of subsets of antennas from available antennas of the mmW device.

The comparator 925 may compare effective array gain values for each subset in the set of subsets of antennas, the effective array gain values based on a realized array gain normalized or penalized by a RF power consumption for each subset in the set of subsets of antennas.

The selection component 930 may select one or more subsets of the set of subsets of antennas based on the comparison.

The communication component 935 may communicate with a second mmW device using the selected one or more subsets of the set of subsets of antennas.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
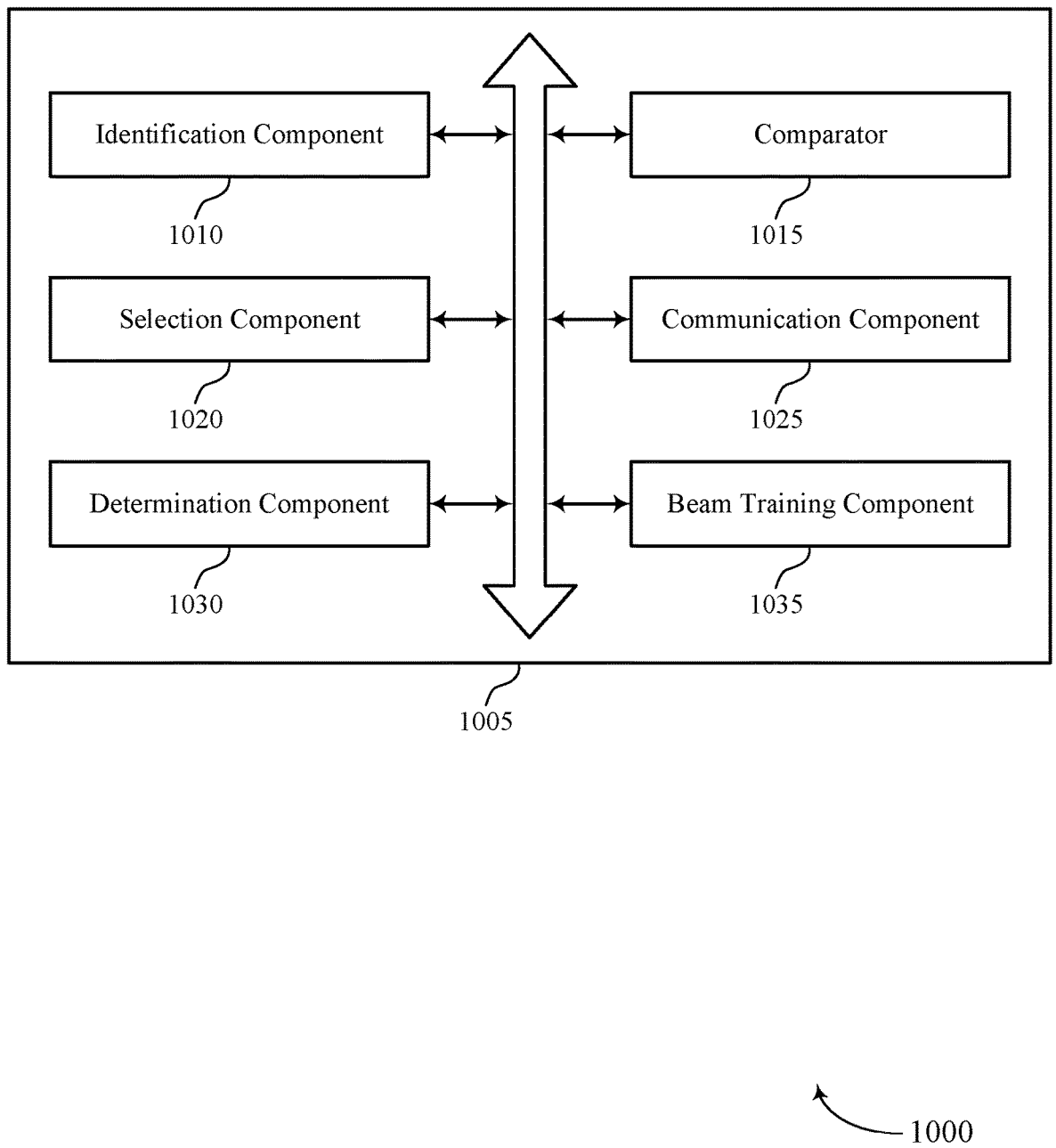
FIG. 10 shows a block diagram of a communications manager that supports methods for dynamic antenna selection in mmW systems in accordance with aspects of the present disclosure.

FIG. 10 shows a block diagram 1000 of a communications manager 1005 that supports methods for dynamic antenna selection in millimeter wave (mmW) systems in accordance with aspects of the present disclosure. The communications manager 1005 may be an example of aspects of a communications manager 815, a communications manager 915, or a communications manager 1110 described herein. The communications manager 1005 may include an identification component 1010, a comparator 1015, a selection component 1020, a communication component 1025, a determination component 1030, and a beam training component 1035. Each of these modules may communicate, directly or indirectly, with one another (e.g., via one or more buses).

The identification component 1010 may identify a set of subsets of antennas from available antennas of the mmW device. In some examples, the available antennas of the mmW device include antennas arranged in one or more planar arrays or linear arrays. Additionally or alternatively, in some examples, the selected one or more subsets correspond to a non-uniform, non-linear antenna array.

The comparator 1015 may compare effective array gain values for each subset in the set of subsets of antennas, the effective array gain values based on a realized array gain normalized or penalized by a RF power consumption for each subset in the set of subsets of antennas.

The selection component 1020 may select one or more subsets of the set of subsets of antennas based on the comparison. In some examples, the selection component 1020 may select a first subset of antennas from the set of subsets of antennas. In some examples, the selection component 1020 may select a second subset of antennas from the set of subsets of antennas.

The selection component 1020 may select a set of subsets of antennas from the available antennas of the mmW device, the selecting based on an expected effective array gain of the subsets of antennas. In some examples, the selection component 1020 may select the one or more subsets of the set of subsets of antennas is based on an expected effective array gain of the subsets of antennas.

The communication component 1025 may communicate with a second mmW device using the selected one or more subsets of the set of subsets of antennas.

In some examples, the communication component 1025 may use a first antenna combination of the selected one or more subsets during a TTI. In some examples, the first antenna combination includes a set of antennas from antennas of the selected one or more subsets. In some examples, the TTI includes the first antenna combination in a first sub-TTI and further includes a second antenna combination of the selected one or more subsets during a second sub-TTI, the TTI spanning one or more symbol periods.

The determination component 1030 may determine an effective array gain value for each subset in the set of subsets of antennas.

In some examples, the determination component 1030 may determine phase shift and amplitude control combinations corresponding to antennas of each subset in the selected one or more subsets. In some examples, the determination component 1030 may reconstruction of the one or more channels is aided by unitary beam training codebooks, quasi-unitary beam training codebooks, or a combination.

In some examples, the determination component 1030 may determine phase shift and amplitude control combinations corresponding to available antennas of the first subset of antennas. In some examples, the determination component 1030 may determine phase shift and amplitude control combinations corresponding to available antennas of the second subset of antennas. In some examples, the determination component 1030 may determine the effective array gain values for the first subset of antennas and the second subset of antennas.

In some examples, the determination component 1030 may determine the phase shift and amplitude control combinations corresponding to available antennas of each subset in the selected one or more subsets. In some examples, the determined effective array gain value for each subset in the set of subsets of antennas is based on a calculated realized array gain with the second mmW device normalized or penalized by RF power consumption corresponding to antennas for each subset in the set of subsets of antennas.

In some examples, the determined effective array gain values for each subset in the set of subsets of antennas are associated with an energy efficiency determination. In some examples, the phase shift and amplitude control combinations corresponding to available antennas of each subset in the selected one or more subsets reconstruct one or more channels for communication at the first mmW device.

The beam training component 1035 may determine the phase shift and amplitude control combinations corresponding to available antennas of the first subset of antennas and available antennas of the second subset of antennas is based on a beam training procedure.

In some examples, performing a beam training procedure for each subset in the selected one or more subsets, where the beam training includes training beams corresponding to available antennas of each subset in the selected one or more subsets. In some examples, the beam training component 1035 may evaluate beam width considerations of the training beams. In some examples, the beam training procedure includes training beams corresponding to available antennas of the first subset of antennas and available antennas of the second subset of antennas.

Figure 11:
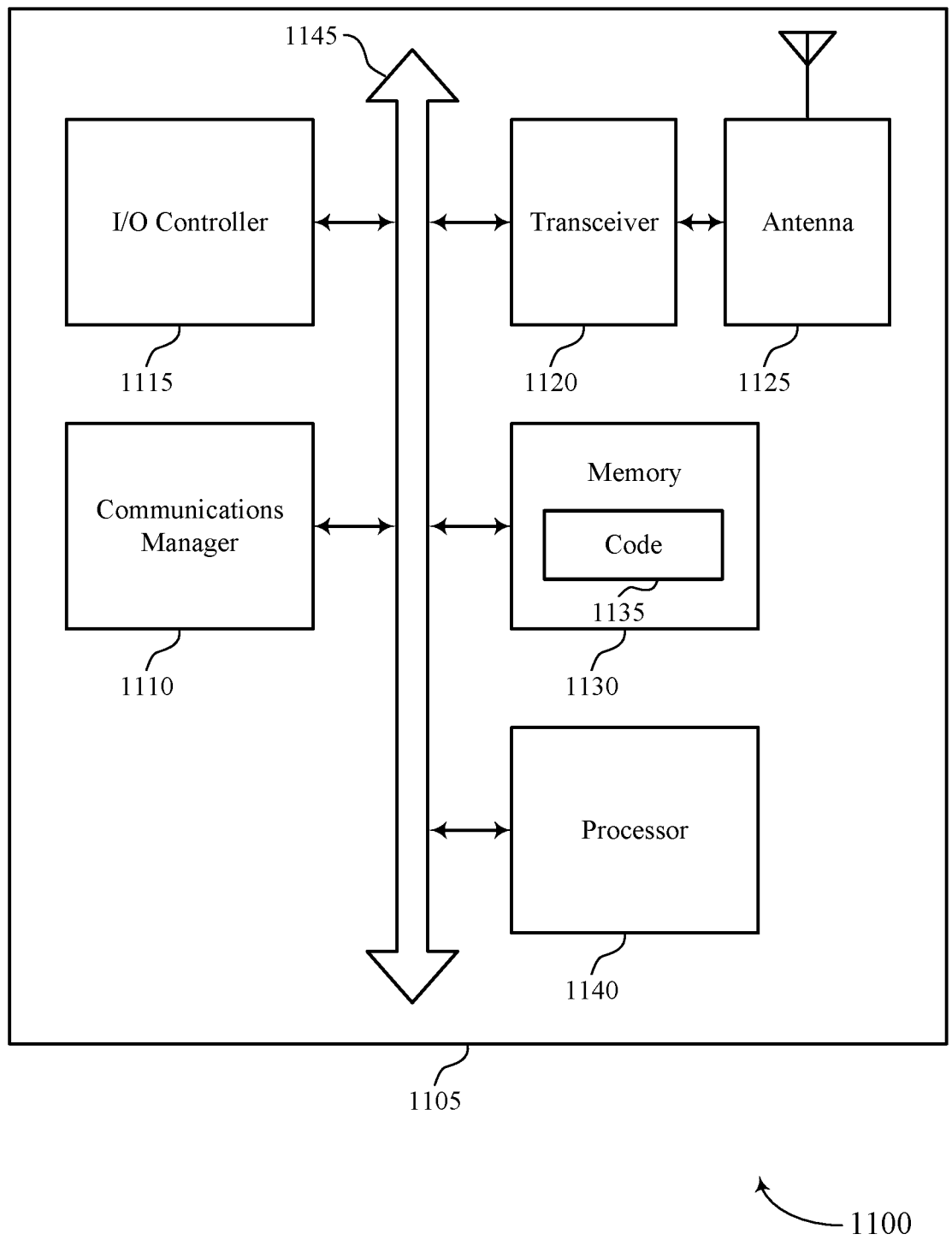
FIG. 11 shows a diagram of a system including a device that supports methods for dynamic antenna selection in mmW systems in accordance with aspects of the present disclosure.

FIG. 11 shows a diagram of a system 1100 including a device 1105 that supports methods for dynamic antenna selection in millimeter wave (mmW) systems in accordance with aspects of the present disclosure. The device 1105 may be an example of or include the components of device 805, device 905, or a device as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a set of subsets of antennas from available antennas of the mmW device, compare effective array gain values for each subset in the set of subsets of antennas, the effective array gain values based on a realized array gain normalized or penalized by a RF power consumption for each subset in the set of subsets of antennas, select one or more subsets of the set of subsets of antennas based on the comparison, and communicate with a second mmW device using the selected one or more subsets of the set of subsets of antennas.

The I/O controller 1115 may manage input and output signals for the device 1105. The I/O controller 1115 may also manage peripherals not integrated into the device 1105. In some examples, the I/O controller 1115 may represent a physical connection or port to an external peripheral. In some examples, the I/O controller 1115 may utilize an operating system such as iOS®, ANDROID®, MS-DOS®, MS-WINDOWS®, OS/2®, UNIX®, LINUX®, or another known operating system. In other examples, the I/O controller 1115 may represent or interact with a modem, a keyboard, a mouse, a touchscreen, or a similar device. In some examples, the I/O controller 1115 may be implemented as part of a processor. In some examples, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some examples, the wireless device may include a single antenna 1125. However, in some examples the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some examples, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination). In some examples, the processor 1140 may be configured to operate a memory array using a memory controller. In other examples, a memory controller may be integrated into the processor 1140. The processor 1140 may be configured to execute computer-readable instructions stored in a memory (e.g., the memory 1130) to cause the device 1105 to perform various functions (e.g., functions or tasks supporting methods for dynamic antenna selection in mmW systems).

The code 1135 may include instructions to implement aspects of the present disclosure, including instructions to support wireless communications. The code 1135 may be stored in a non-transitory computer-readable medium such as system memory or other type of memory. In some examples, the code 1135 may not be directly executable by the processor 1140 but may cause a computer (e.g., when compiled and executed) to perform functions described herein.

Figure 12:
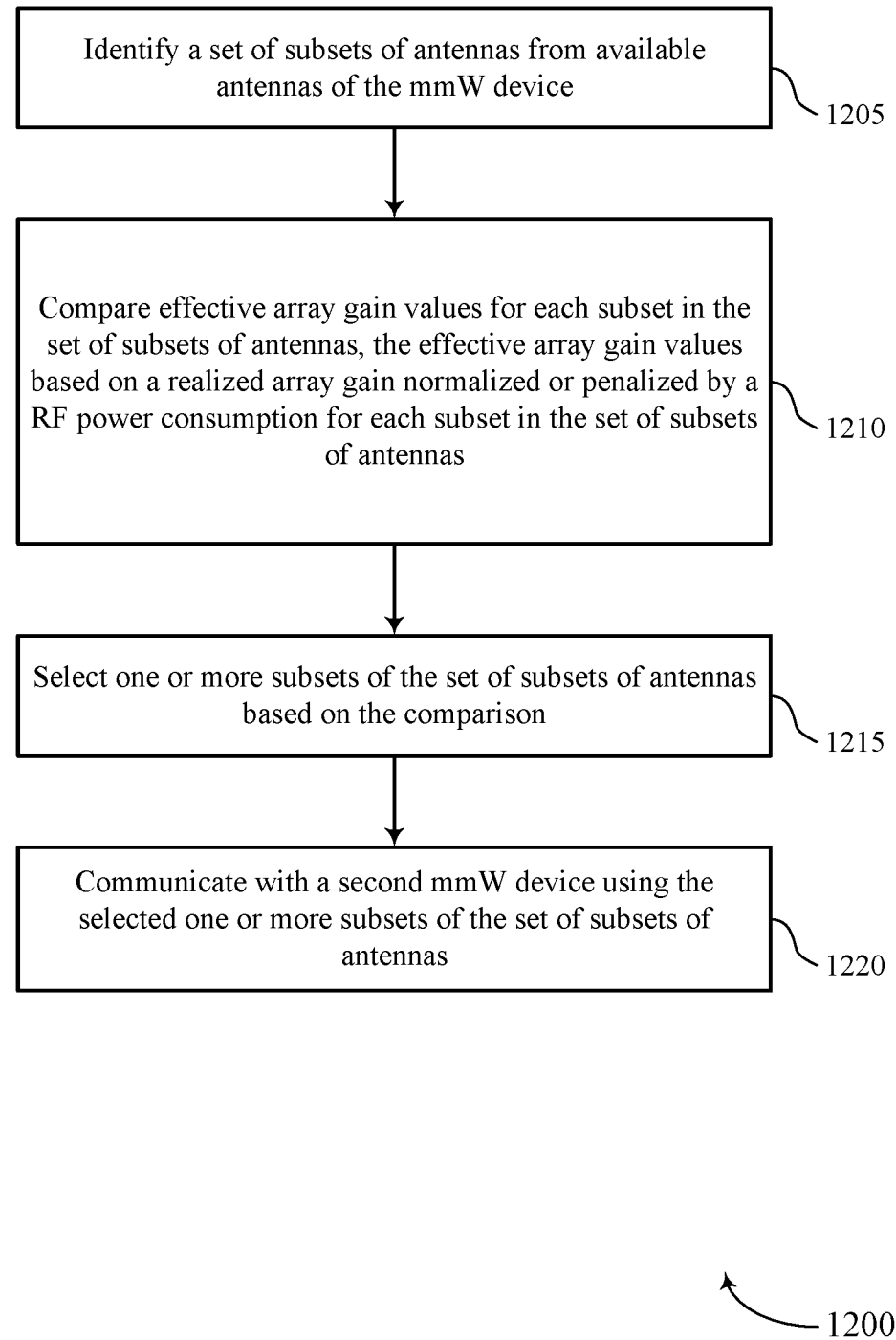
FIGS. 12-14 show flowcharts illustrating methods that support methods for dynamic antenna selection in mmW systems in accordance with aspects of the present disclosure.

FIG. 12 shows a flowchart illustrating a method 1200 that supports methods for dynamic antenna selection in millimeter wave (mmW) systems in accordance with aspects of the present disclosure. The operations of method 1200 may be implemented by a device or the components of a device, as described herein. For example, the operations of method 1200 may be performed by a communications manager as described with reference to FIGS. 8-11. In some examples, a device may execute a set of instructions to control the functional elements of the device to perform the functions described below. Additionally or alternatively, a device may perform aspects of the functions described below using special-purpose hardware.

At 1205, the device may identify a set of subsets of antennas from available antennas of the mmW device. The operations of 1205 may be performed according to the methods described herein. In some examples, aspects of the operations of 1205 may be performed by an Identification Component as described with reference to FIGS. 8-11.

At 1210, the device may compare effective array gain values for each subset in the set of subsets of antennas, the effective array gain values based on a realized array gain normalized or penalized by a RF power consumption for each subset in the set of subsets of antennas. The operations of 1210 may be performed according to the methods described herein. In some examples, aspects of the operations of 1210 may be performed by a Comparator as described with reference to FIGS. 8-11.

At 1215, the device may select one or more subsets of the set of subsets of antennas based on the comparison. The operations of 1215 may be performed according to the methods described herein. In some examples, aspects of the operations of 1215 may be performed by a selection component as described with reference to FIGS. 8-11.

At 1220, the device may communicate with a second mmW device using the selected one or more subsets of the set of subsets of antennas. The operations of 1220 may be performed according to the methods described herein. In some examples, aspects of the operations of 1220 may be performed by a communication component as described with reference to FIGS. 8-11.

Figure 13:
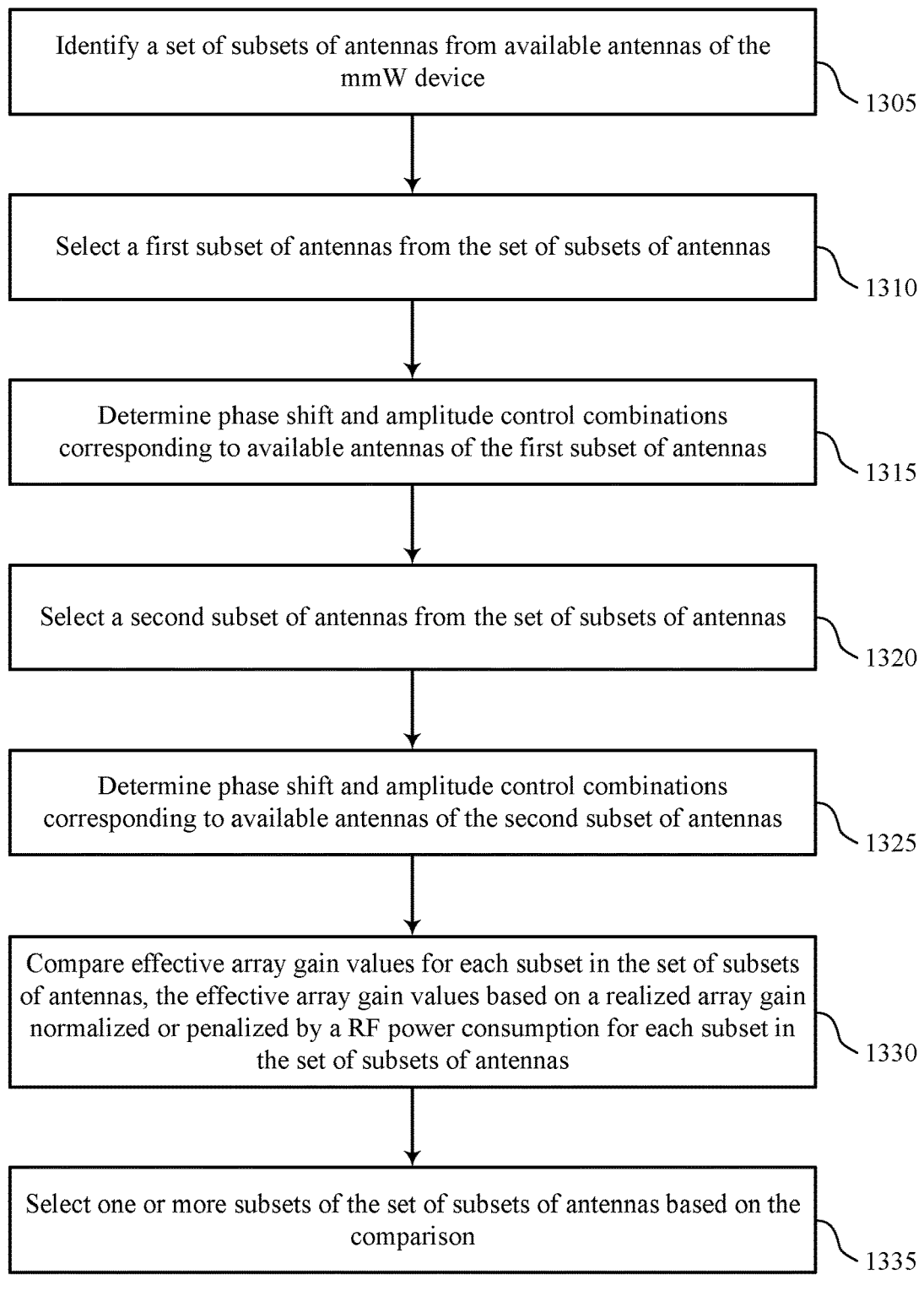

FIG. 13 shows a flowchart illustrating a method 1300 that supports methods for dynamic antenna selection in millimeter wave (mmW) systems in accordance with aspects of the present disclosure. The operations of method 1300 may be implemented by a device or its components as described herein. For example, the operations of method 1300 may be performed by a communications manager as described with reference to FIGS. 8-11. In some examples, a device may execute a set of instructions to control the functional elements of the device to perform the functions described below. Additionally or alternatively, a device may perform aspects of the functions described below using special-purpose hardware.

At 1305, the device may identify a set of subsets of antennas from available antennas of the mmW device. The operations of 1305 may be performed according to the methods described herein. In some examples, aspects of the operations of 1305 may be performed by an identification component as described with reference to FIGS. 8-11.

At 1310, the device may select a first subset of antennas from the set of subsets of antennas. The operations of 1310 may be performed according to the methods described herein. In some examples, aspects of the operations of 1310 may be performed by a selection component as described with reference to FIGS. 8-11.

At 1315, the device may determine phase shift and amplitude control combinations corresponding to available antennas of the first subset of antennas. The operations of 1315 may be performed according to the methods described herein. In some examples, aspects of the operations of 1315 may be performed by a determination component as described with reference to FIGS. 8-11.

At 1320, the device may select a second subset of antennas from the set of subsets of antennas. The operations of 1320 may be performed according to the methods described herein. In some examples, aspects of the operations of 1320 may be performed by a selection component as described with reference to FIGS. 8-11.

At 1325, the device may determine phase shift and amplitude control combinations corresponding to available antennas of the second subset of antennas. The operations of 1325 may be performed according to the methods described herein. In some examples, aspects of the operations of 1325 may be performed by a determination component as described with reference to FIGS. 8-11.

At 1330, the device may compare effective array gain values for each subset in the set of subsets of antennas, the effective array gain values based on a realized array gain normalized or penalized by a RF power consumption for each subset in the set of subsets of antennas. The operations of 1330 may be performed according to the methods described herein. In some examples, aspects of the operations of 1330 may be performed by a comparator as described with reference to FIGS. 8-11.

At 1335, the device may select one or more subsets of the set of subsets of antennas based on the comparison. The operations of 1335 may be performed according to the methods described herein. In some examples, aspects of the operations of 1335 may be performed by a selection component as described with reference to FIGS. 8-11.

Figure 14:
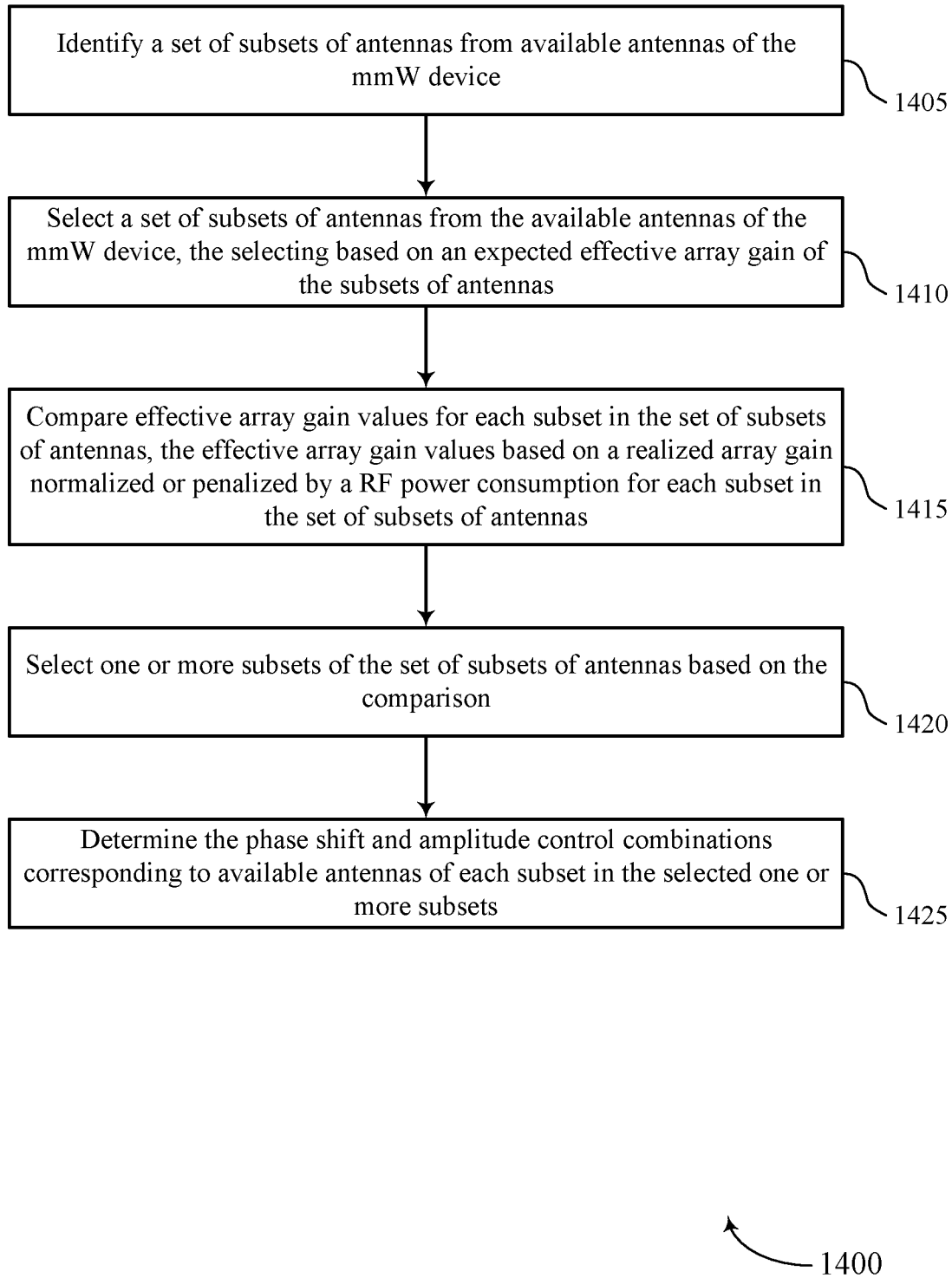

FIG. 14 shows a flowchart illustrating a method 1400 that supports methods for dynamic antenna selection in millimeter wave (mmW) systems in accordance with aspects of the present disclosure. The operations of method 1400 may be implemented by a device or its components as described herein. For example, the operations of method 1400 may be performed by a communications manager as described with reference to FIGS. 8-11. In some examples, a device may execute a set of instructions to control the functional elements of the device to perform the functions described below. Additionally or alternatively, a device may perform aspects of the functions described below using special-purpose hardware.

At 1405, the device may identify a set of subsets of antennas from available antennas of the mmW device. The operations of 1405 may be performed according to the methods described herein. In some examples, aspects of the operations of 1405 may be performed by an identification component as described with reference to FIGS. 8-11.

At 1410, the device may select a set of subsets of antennas from the available antennas of the mmW device, the selecting based on an expected effective array gain of the subsets of antennas. The operations of 1410 may be performed according to the methods described herein. In some examples, aspects of the operations of 1410 may be performed by a selection component as described with reference to FIGS. 8-11.

At 1415, the device may compare effective array gain values for each subset in the set of subsets of antennas, the effective array gain values based on a realized array gain normalized or penalized by a RF power consumption for each subset in the set of subsets of antennas. The operations of 1415 may be performed according to the methods described herein. In some examples, aspects of the operations of 1415 may be performed by a comparator as described with reference to FIGS. 8-11.

At 1420, the device may select one or more subsets of the set of subsets of antennas based on the comparison. The operations of 1420 may be performed according to the methods described herein. In some examples, aspects of the operations of 1420 may be performed by a selection component as described with reference to FIGS. 8-11.

At 1425, the device may determine the phase shift and amplitude control combinations corresponding to available antennas of each subset in the selected one or more subsets. The operations of 1425 may be performed according to the methods described herein. In some examples, aspects of the operations of 1425 may be performed by a determination component as described with reference to FIGS. 8-11.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method for wireless communication in a mmW system that includes identifying a plurality of subsets of antennas from available antennas of the mmW device, comparing effective array gain values for each subset in the plurality of subsets of antennas, the effective array gain values based on a realized array gain normalized or penalized by a RF power consumption for each subset in the plurality of subsets of antennas, selecting one or more subsets of the plurality of subsets of antennas based on the comparison, and communicating with a second mmW device using the selected one or more subsets of the plurality of subsets of antennas.

In Example 2, the communicating using the one or more subsets further includes using a first antenna combination of the selected one or more subsets during a TTI.

In Example 3, the method of Example 2 further includes a plurality of antennas from antennas of the selected one or more subsets.

In Example 4, the method of any of Examples 1-3 further include determining an effective array gain value for each subset in the plurality of subsets of antennas.

In Example 5, the method of any of Examples 1-4 further includes determining phase shift and amplitude control combinations corresponding to antennas of each subset in the selected one or more subsets.

In Example, 6, the method of any of Examples 1-4 further includes where the TTI comprises the first antenna combination in a first sub-TTI and further comprises a second antenna combination of the selected one or more subsets during a second sub-TTI, the TTI spanning one or more symbol periods.

In Example, 7, the method of any of Examples 1-4 further includes the determined effective array gain value for each subset in the plurality of subsets of antennas is based on a calculated realized array gain with the second mmW device normalized or penalized by RF power consumption corresponding to antennas for each subset in the plurality of subsets of antennas.

In Example 8, the method of any of Examples 1-6 further includes the determined effective array gain values for each subset in the plurality of subsets of antennas are associated with an energy efficiency determination.

In Example 9, the method of Example 5 further includes where the phase shift and amplitude control combinations corresponding to available antennas of each subset in the selected one or more subsets reconstruct one or more channels for communication at the first mmW device.

In Example 10, the method of Example 9 further includes where reconstruction of the one or more channels is aided by unitary beam training codebooks, quasi-unitary beam training codebooks, or a combination.

In Example 11, the method of any of Examples 1-9 further includes selecting a first subset of antennas from the plurality of subsets of antennas, determining phase shift and amplitude control combinations corresponding to available antennas of the first subset of antennas, selecting a second subset of antennas from the plurality of subsets of antennas, determining phase shift and amplitude control combinations corresponding to available antennas of the second subset of antennas, and determining the effective array gain values for the first subset of antennas and the second subset of antennas.

In Example 12, the method of any of Examples 1-10 further includes where determining the phase shift and amplitude control combination for the first subset of antennas and the second subset of antennas is based on a beam training procedure.

In Example 13, the method of claim 11 further includes where the beam training procedure comprises training beams corresponding to antennas of the first subset of antennas and antennas of the second subset of antennas.

In Example 14, the method of any of Examples 1-9 further includes selecting a plurality of subsets of antennas from the available antennas of the mmW device, the selecting based on an expected effective array gain of the subsets of antennas, and determining the phase shift and amplitude control combinations corresponding to available antennas of each subset in the selected one or more subsets.

In Example, 15 the method of any of Examples 1-9 further includes where selecting the one or more subsets of the plurality of subsets of antennas is based on an expected effective array gain of the subsets of antennas.

In Example 16, the method of Example 14 further includes where calculating the phase shift and amplitude control combinations further includes performing beam training on the set of antenna combinations, where the beam training comprises training beams corresponding to antennas of the set of antenna combinations.

In Example 17, the method of any of Examples 14 and 16 further includes where performing the beam training on the selected subset of antennas further includes evaluating beam width considerations of the training beams.

In Example 18, the method of any of Examples 1-15 further includes where the available antennas of the mmW system comprise antennas arranged in a planar array or linear array.

In Example 19, the method of any of Examples 1-18 further includes where the set of antenna combinations correspond to a non-uniform, non-linear antenna array.

Example 20 is a system or apparatus including means for implementing a method or realizing an apparatus as in any of Examples 1-19.

Example 21 is a non-transitory computer-readable medium storing instructions executable by one or more processors to cause the one or more processors to implement a method as in any of Examples 1-19.

It should be noted that the methods described above describe possible implementations, and that the operations and the steps may be rearranged or otherwise modified and that other implementations are possible. Aspects from two or more of the methods may be combined. Further aspects from the examples may me combined with other examples or aspects of other examples discussed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first millimeter wave (mmW) device, comprising:
    identifying a plurality of subsets of antennas from available antennas of the first mmW device;
    comparing effective array gain values for each subset in the plurality of subsets of antennas, the effective array gain values based at least in part on a realized array gain normalized or penalized by a radio frequency (RF) power consumption by the first mmW device for each subset in the plurality of subsets of antennas;
    selecting one or more subsets of the plurality of subsets of antennas based at least in part on the comparison, the selected one or more subsets associated with an effective array gain value that is subject to the RF power consumption; and
    communicating with a second mmW device using the selected one or more subsets of the plurality of subsets of antennas.

2. The method of claim 1, wherein communicating using the one or more subsets further comprises:
    using a first antenna combination of the selected one or more subsets during a transmission time interval (TTI).

3. The method of claim 2, wherein the first antenna combination comprises a plurality of antennas from antennas of the selected one or more subsets.

4. The method of claim 2, wherein the using the antenna combination during the TTI comprises using the first antenna combination in a first sub-TTI and further comprises using a second antenna combination of the selected one or more subsets during a second sub-TTI, the TTI spanning one or more symbol periods.

5. The method of claim 1, wherein comparing the effective array gain values for each subset in the plurality of subsets of antennas further comprises:
    determining an effective array gain value for each subset in the plurality of subsets of antennas.

6. The method of claim 5, wherein the determined effective array gain value for each subset in the plurality of subsets of antennas is based at least in part on a calculated realized array gain with the second mmW device normalized or penalized by radio frequency (RF) power consumption corresponding to antennas for each subset in the plurality of subsets of antennas.

7. The method of claim 5, wherein the determined effective array gain values for each subset in the plurality of subsets of antennas are associated with an energy efficiency determination.

8. The method of claim 1, wherein selecting the one or more subsets further comprises:
    determining phase shift and amplitude control combinations corresponding to antennas of each subset in the selected one or more subsets.

9. The method of claim 8, wherein the phase shift and amplitude control combinations corresponding to available antennas of each subset in the selected one or more subsets reconstruct one or more channels for communication at the first mmW device.

10. The method of claim 9, wherein:
    reconstruction of the one or more channels is aided by unitary beam training codebooks, quasi-unitary beam training codebooks, or a combination thereof.

11. The method of claim 1, further comprising:
    selecting a first subset of antennas from the plurality of subsets of antennas;
    determining phase shift and amplitude control combinations corresponding to available antennas of the first subset of antennas;
    selecting a second subset of antennas from the plurality of subsets of antennas;
    determining phase shift and amplitude control combinations corresponding to available antennas of the second subset of antennas; and
    determining the effective array gain values for the first subset of antennas and the second subset of antennas.

12. The method of claim 11, wherein:
    determining the phase shift and amplitude control combinations corresponding to available antennas of the first subset of antennas and available antennas of the second subset of antennas is based at least in part on a beam training procedure.

13. The method of claim 12, wherein the beam training procedure comprises training beams corresponding to available antennas of the first subset of antennas and available antennas of the second subset of antennas.

14. The method of claim 1, further comprising:
    selecting a plurality of subsets of antennas from the available antennas of the first mmW device, the selecting based at least in part on an expected effective array gain of the subsets of antennas; and
    determining the phase shift and amplitude control combinations corresponding to available antennas of each subset in the selected one or more subsets.

15. The method of claim 14, wherein determining the phase shift and amplitude control combinations corresponding to available antennas of each subset in the selected one or more subsets further comprises:
    performing a beam training procedure for each subset in the selected one or more subsets, wherein the beam training comprises training beams corresponding to available antennas of each subset in the selected one or more subsets.

16. The method of claim 15, wherein performing the beam training on the selected one or more subsets further comprises:
    evaluating beam width considerations of the training beams.

17. The method of claim 1, wherein:
    selecting the one or more subsets of the plurality of subsets of antennas is based at least in part on an expected effective array gain of the subsets of antennas.

18. The method of claim 1, wherein the available antennas of the first mmW device comprise antennas arranged in one or more planar arrays or linear arrays.

19. The method of claim 1, wherein the selected one or more subsets correspond to a non-uniform, non-linear antenna array.

20. An apparatus for wireless communication at a first millimeter wave (mmW) device, comprising:
    a processor,
    memory in electronic communication with the processor; and
    instructions stored in the memory and executable by the processor to cause the apparatus to:
        identify a plurality of subsets of antennas from available antennas of the first mmW device;
        compare effective array gain values for each subset in the plurality of subsets of antennas, the effective array gain values based at least in part on a realized array gain normalized or penalized by a radio frequency (RF) power consumption by the first mmW device for each subset in the plurality of subsets of antennas;
        select one or more subsets of the plurality of subsets of antennas based at least in part on the comparison, the selected one or more subsets corresponding to an effective array gain value that is subject to the RF power consumption; and
        communicate with a second mmW device using the selected one or more subsets of the plurality of subsets of antennas.

21. The apparatus of claim 20, wherein the instructions to communicate using the one or more subsets further are executable by the processor to cause the apparatus to:
    use a first antenna combination of the selected one or more subsets during a transmission time interval (TTI).

22. The apparatus of claim 21, wherein the first antenna combination comprises a plurality of antennas from antennas of the selected one or more subsets.

23. The apparatus of claim 21, wherein the TTI comprises the first antenna combination in a first sub-TTI and further comprises a second antenna combination of the selected one or more subsets during a second sub-TTI, the TTI spanning one or more symbol periods.

24. The apparatus of claim 20, wherein the instructions to compare the effective array gain values for each subset in the plurality of subsets of antennas further are executable by the processor to cause the apparatus to:
    determine an effective array gain value for each subset in the plurality of subsets of antennas.

25. The apparatus of claim 20, wherein the instructions to select the one or more subsets further are executable by the processor to cause the apparatus to:
    determine phase shift and amplitude control combinations corresponding to antennas of each subset in the selected one or more subsets.

26. The apparatus of claim 20, wherein the instructions are further executable by the processor to cause the apparatus to:
    select a first subset of antennas from the plurality of subsets of antennas;
    determine phase shift and amplitude control combinations corresponding to available antennas of the first subset of antennas;
    select a second subset of antennas from the plurality of subsets of antennas;
    determine phase shift and amplitude control combinations corresponding to available antennas of the second subset of antennas; and
    determine the effective array gain values for the first subset of antennas and the second subset of antennas.

27. The apparatus of claim 20, wherein the instructions are further executable by the processor to cause the apparatus to:
    select a plurality of subsets of antennas from the available antennas of the first mmW device, the selecting based at least in part on an expected effective array gain of the subsets of antennas; and
    determine the phase shift and amplitude control combinations corresponding to available antennas of each subset in the selected one or more subsets.

28. The apparatus of claim 27, wherein the instructions to determine the phase shift and amplitude control combinations corresponding to available antennas of each subset in the selected one or more subsets further are executable by the processor to cause the apparatus to:
    the instructions to perform a beam training procedure for each subset in the selected one or more subsets, wherein the beam training are executable by the processor to cause the apparatus to train beams corresponding to available antennas of each subset in the selected one or more subsets.

29. An apparatus for wireless communication at a first millimeter wave (mmW) device, comprising:
    means for identifying a plurality of subsets of antennas from available antennas of the first mmW device;
    means for comparing effective array gain values for each subset in the plurality of subsets of antennas, the effective array gain values based at least in part on a realized array gain normalized or penalized by a radio frequency (RF) power consumption by the first mmW device for each subset in the plurality of subsets of antennas;
    means for selecting one or more subsets of the plurality of subsets of antennas based at least in part on the comparison, the selected one or more subsets corresponding to an effective array gain value that is subject to the RF power consumption; and
    means for communicating with a second mmW device using the selected one or more subsets of the plurality of subsets of antennas.

30. A non-transitory computer-readable medium storing code for wireless communication at a first millimeter wave (mmW) apparatus, the code comprising instructions executable by a processor to:
    identify a plurality of subsets of antennas from available antennas of the first mmW apparatus;
    compare effective array gain values for each subset in the plurality of subsets of antennas, the effective array gain values based at least in part on a realized array gain normalized or penalized by a radio frequency (RF) power consumption by the first mmW apparatus for each subset in the plurality of subsets of antennas;
    select one or more subsets of the plurality of subsets of antennas based at least in part on the comparison, the selected one or more subsets corresponding to an effective array gain value that is subject to the RF power consumption; and communicate with a second mmW apparatus using the selected one or more subsets of the plurality of subsets of antennas.

\* \* \* \* \*